US009957366B2

(12) United States Patent
Topolkaraev et al.

(10) Patent No.: US 9,957,366 B2
(45) Date of Patent: *May 1, 2018

(54) TECHNIQUE FOR SELECTIVELY CONTROLLING THE POROSITY OF A POLYMERIC MATERIAL

(71) Applicant: Kimberly-Clark Worldwide, Inc., Neenah, WI (US)

(72) Inventors: Vasily A. Topolkaraev, Appleton, WI (US); Ryan J. McEneany, Appleton, WI (US); Neil T. Scholl, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/909,587

(22) PCT Filed: Jun. 6, 2014

(86) PCT No.: PCT/IB2014/062036
§ 371 (c)(1),
(2) Date: Feb. 2, 2016

(87) PCT Pub. No.: WO2015/019202
PCT Pub. Date: Feb. 12, 2015

(65) Prior Publication Data
US 2016/0185929 A1    Jun. 30, 2016

Related U.S. Application Data

(60) Provisional application No. 61/863,933, filed on Aug. 9, 2013, provisional application No. 61/907,602, filed on Nov. 22, 2013.

(51) Int. Cl.
| *C08J 9/00* | (2006.01) |
| *B29C 55/00* | (2006.01) |
| *C08J 5/18* | (2006.01) |
| *C08J 9/36* | (2006.01) |
| *B29K 105/04* | (2006.01) |
| *B29K 105/16* | (2006.01) |

(52) U.S. Cl.
CPC .......... *C08J 9/0061* (2013.01); *B29C 55/005* (2013.01); *C08J 5/18* (2013.01); *C08J 9/36* (2013.01); *B29K 2105/04* (2013.01); *B29K 2105/16* (2013.01); *C08J 2300/22* (2013.01); *C08J 2367/04* (2013.01); *C08J 2423/08* (2013.01); *C08J 2423/16* (2013.01)

(58) Field of Classification Search
CPC ..... C08J 9/0061; C08J 5/18; C08J 9/36; C08J 2300/22; C08J 2367/04; C08J 2423/08; C08J 2423/16; B29C 55/005; B29K 2105/04; B29K 2105/16
See application file for complete search history.

(56) References Cited

U.S. PATENT DOCUMENTS

| 3,338,992 A | 8/1967 | Kinney |
| 3,423,255 A | 1/1969 | Joyce |
| 3,692,618 A | 9/1972 | Dorschner et al. |
| 3,726,955 A | 4/1973 | Hughes et al. |
| 3,802,817 A | 4/1974 | Matsuki et al. |
| 3,855,046 A | 12/1974 | Hansen et al. |
| 4,041,203 A | 8/1977 | Brock et al. |
| 4,055,702 A | 10/1977 | Guthrie et al. |
| 4,100,324 A | 7/1978 | Anderson et al. |
| 4,282,735 A | 8/1981 | Break |
| 4,374,888 A | 2/1983 | Bornslaeger |
| 4,375,718 A | 3/1983 | Wadsworth et al. |
| 4,405,688 A | 9/1983 | Lowery et al. |
| 4,557,132 A | 12/1985 | Break |
| 4,592,815 A | 6/1986 | Nakao |
| 4,698,372 A | 10/1987 | Moss |
| 4,708,800 A | 11/1987 | Ichikawa et al. |
| 4,741,944 A | 5/1988 | Jackson et al. |
| 4,766,029 A | 8/1988 | Brock et al. |
| 4,770,931 A | 9/1988 | Pollock et al. |
| 4,789,592 A | 12/1988 | Taniguchi et al. |
| 4,789,699 A | 12/1988 | Kieffer et al. |
| 4,797,468 A | 1/1989 | De Vries |

(Continued)

FOREIGN PATENT DOCUMENTS

WO    WO 2012/109144 A1    8/2012

OTHER PUBLICATIONS

Brad Jones et al,. Nanoporous Materials Derived from Polymeric Bicontinuous Microemulsions, Chemistry of Materials Communication, 3 pages, Jan. 6, 2010, vol. 22, pp. 1279-1281.
E.K. Patel et al., Nanosponge and Micro Sponges: A Novel Drug Delivery System, International Journal of Research in Pharmacy and Chemistry, 8 pages, 2012, vol. 2, No. 2, pp. 237-244.
Zhiwei Xie, et al., Electrospun Poly (D,L-lactide) Fibers for Drug Delivery: The Influence of Cosolvent and the Mechanism of Drug Release, Journal of Applied Polymer Science, 8 pages, 2010, vol. 22, pp. 1279-1281.

(Continued)

*Primary Examiner* — Nathan M Nutter
(74) *Attorney, Agent, or Firm* — Dority & Manning, P.A.

(57) ABSTRACT

A method for selectively controlling the degree of porosity in a polymeric material is provided. The material is formed from a thermoplastic composition containing a microinclusion additive and nanoinclusion additive that are dispersed within a continuous phase of a matrix polymer in the form of discrete domains. At least a portion of the polymeric material is strained so that a porous network is formed therein, Further, at least a portion of the strained polymeric material is heat treated so that it exhibits a Sower pore volume than the material prior to heat treatment, in this manner, the polymeric material can exhibit a high degree of initial flexibility, but this flexibility can be selectively reduced when desired.

31 Claims, 11 Drawing Sheets

(56) References Cited

U.S. PATENT DOCUMENTS

| | | |
|---|---|---|
| 4,822,678 A | 4/1989 | Brody et al. |
| 4,937,299 A | 6/1990 | Ewen et al. |
| 4,983,450 A | 1/1991 | Yanagihara |
| D315,990 S | 4/1991 | Blenke et al. |
| 5,030,404 A | 7/1991 | Bonnebat et al. |
| 5,084,334 A | 1/1992 | Hamano et al. |
| 5,169,706 A | 12/1992 | Collier, IV et al. |
| 5,169,712 A | 12/1992 | Tapp |
| 5,179,164 A | 1/1993 | Lausberg et al. |
| 5,213,881 A | 5/1993 | Timmons et al. |
| 5,218,071 A | 6/1993 | Tsutsui et al. |
| 5,238,735 A | 8/1993 | Nagou et al. |
| 5,252,642 A | 10/1993 | Sinclair et al. |
| 5,272,236 A | 12/1993 | Lai et al. |
| 5,278,272 A | 1/1994 | Lai et al. |
| 5,284,703 A | 2/1994 | Everhart et al. |
| 5,322,728 A | 6/1994 | Davey et al. |
| 5,330,348 A | 7/1994 | Aneja et al. |
| 5,336,552 A | 8/1994 | Strack et al. |
| 5,350,624 A | 9/1994 | Georger et al. |
| 5,382,400 A | 1/1995 | Pike et al. |
| D358,035 S | 5/1995 | Zander et al. |
| 5,422,377 A | 6/1995 | Aubert |
| 5,464,688 A | 11/1995 | Timmons et al. |
| 5,470,944 A | 11/1995 | Bonsignore |
| 5,472,775 A | 12/1995 | Obijeski et al. |
| 5,503,785 A | 4/1996 | Crump et al. |
| 5,539,056 A | 7/1996 | Yang et al. |
| 5,540,332 A | 7/1996 | Kopacz et al. |
| 5,547,756 A | 8/1996 | Kamo et al. |
| 5,571,619 A | 11/1996 | McAlpin et al. |
| 5,596,052 A | 1/1997 | Resconi et al. |
| 5,620,779 A | 4/1997 | Levy et al. |
| 5,667,635 A | 9/1997 | Win et al. |
| D384,508 S | 10/1997 | Zander et al. |
| D384,819 S | 10/1997 | Zander et al. |
| 5,695,868 A | 12/1997 | McCormack |
| D390,708 S | 2/1998 | Brown |
| 5,714,573 A | 2/1998 | Randall et al. |
| 5,764,521 A | 6/1998 | Batchelder et al. |
| 5,770,682 A | 6/1998 | Ohara et al. |
| 5,800,758 A | 6/1998 | Tsai et al. |
| 5,814,673 A | 9/1998 | Khait |
| 5,821,327 A | 10/1998 | Oota et al. |
| 5,843,057 A | 12/1998 | McCormack |
| 5,880,254 A | 3/1999 | Ohara et al. |
| 5,888,524 A | 3/1999 | Cole |
| 5,931,823 A | 8/1999 | Stokes et al. |
| 5,932,497 A | 8/1999 | Morman et al. |
| 5,962,112 A | 10/1999 | Haynes et al. |
| 5,968,643 A | 10/1999 | Topolkaraev et al. |
| 5,855,999 A | 11/1999 | McCormack |
| 5,997,981 A | 12/1999 | McCormack et al. |
| 6,002,064 A | 12/1999 | Kobylivker et al. |
| 6,004,124 A | 12/1999 | Swanson et al. |
| D418,305 S | 1/2000 | Zander et al. |
| 6,015,764 A | 1/2000 | McCormack et al. |
| 6,028,018 A | 2/2000 | Amundson et al. |
| 6,037,281 A | 3/2000 | Mathis et al. |
| 6,057,024 A | 5/2000 | Mleziva |
| 6,060,638 A | 5/2000 | Paul et al. |
| 6,070,107 A | 5/2000 | Lombardi et al. |
| 6,071,451 A | 6/2000 | Wang et al. |
| D428,267 S | 7/2000 | Romano, III et al. |
| 6,090,325 A | 7/2000 | Wheat et al. |
| 6,093,665 A | 7/2000 | Sayovitz et al. |
| 6,096,014 A | 8/2000 | Haffner et al. |
| 6,150,002 A | 11/2000 | Varona |
| 6,153,138 A | 11/2000 | Helms, Jr. et al. |
| 6,197,237 B1 | 3/2001 | Tsai et al. |
| 6,228,923 B1 | 5/2001 | Lombardi et al. |
| 6,235,825 B1 | 5/2001 | Yoshida et al. |
| 6,268,048 B1 | 7/2001 | Topolkaraev et al. |
| 6,326,458 B1 | 12/2001 | Gruber et al. |
| 6,337,198 B1 | 1/2002 | Levene et al. |
| 6,348,258 B1 | 2/2002 | Topolkaraev et al. |
| 6,389,864 B1 | 5/2002 | Chubb et al. |
| 6,391,932 B1 | 5/2002 | Gore et al. |
| 6,431,477 B1 | 8/2002 | Pallmann |
| 6,440,437 B1 | 8/2002 | Krzysik et al. |
| 6,461,457 B1 | 10/2002 | Taylor et al. |
| 6,479,003 B1 | 11/2002 | Furgiuele et al. |
| 6,494,390 B1 | 12/2002 | Khait et al. |
| 6,500,563 B1 | 12/2002 | Datta et al. |
| 6,582,810 B2 | 6/2003 | Heffelfinger |
| 6,660,211 B2 | 12/2003 | Topolkaraev et al. |
| 6,713,175 B1 | 3/2004 | Terada et al. |
| 6,790,403 B1 | 9/2004 | Priedeman, Jr. et al. |
| 6,811,874 B2 | 11/2004 | Tanaka et al. |
| 6,818,173 B1 | 11/2004 | Khait |
| 6,824,680 B2 | 11/2004 | Chandavasu et al. |
| 6,838,403 B2 | 1/2005 | Tsai et al. |
| 6,905,759 B2 | 6/2005 | Topolkaraev et al. |
| 6,914,018 B1 | 7/2005 | Uitenbroek et al. |
| 6,923,634 B2 | 8/2005 | Swanson et al. |
| 7,078,453 B1 * | 7/2006 | Feeney et al. ......... B82Y 30/00 524/444 |
| 7,097,904 B2 | 8/2006 | Ochi et al. |
| 7,122,246 B2 | 10/2006 | Comb et al. |
| 7,141,168 B2 | 11/2006 | Sakamoto et al. |
| 7,223,359 B2 | 5/2007 | Torkelson et al. |
| 7,273,894 B2 | 9/2007 | Shelby et al. |
| 7,354,973 B2 | 4/2008 | Flexman |
| 7,368,503 B2 | 5/2008 | Hale |
| 7,445,735 B2 | 11/2008 | Miller et al. |
| 7,510,133 B2 | 3/2009 | Pallmann |
| 7,604,470 B2 | 10/2009 | LaBossiere et al. |
| 7,619,132 B2 | 11/2009 | Topolkaraev et al. |
| 7,625,200 B2 | 12/2009 | Leavitt |
| 7,754,807 B2 | 7/2010 | Priedeman, Jr. et al. |
| 7,891,964 B2 | 2/2011 | Skubic et al. |
| 7,910,041 B1 | 3/2011 | Priedeman, Jr. |
| 7,914,891 B2 | 3/2011 | Amundson et al. |
| 7,935,418 B2 | 5/2011 | Koops et al. |
| 7,989,062 B2 | 8/2011 | Chakravarty et al. |
| 8,076,406 B2 | 12/2011 | Brule et al. |
| 8,268,738 B2 | 9/2012 | McEneany et al. |
| 8,268,913 B2 | 9/2012 | Li et al. |
| 8,287,677 B2 | 10/2012 | Lake et al. |
| 8,323,837 B2 | 12/2012 | Nishida et al. |
| 8,334,327 B2 | 12/2012 | Kaufman et al. |
| 8,362,145 B2 | 1/2013 | Li et al. |
| 8,372,917 B2 | 2/2013 | Li et al. |
| 8,394,306 B2 | 3/2013 | Nishida et al. |
| 8,410,215 B2 | 4/2013 | Sano et al. |
| 8,444,905 B2 | 5/2013 | Li et al. |
| 8,466,337 B2 | 6/2013 | Wang et al. |
| 8,512,024 B2 | 8/2013 | Pax |
| 8,530,577 B2 | 9/2013 | Li et al. |
| 8,545,971 B2 | 10/2013 | Li et al. |
| 8,586,192 B2 | 11/2013 | Li et al. |
| 8,628,718 B2 | 1/2014 | Li et al. |
| 8,637,130 B2 | 1/2014 | Wang et al. |
| 8,658,069 B2 | 2/2014 | Auffermann et al. |
| 8,684,739 B2 | 4/2014 | Steffier et al. |
| 8,759,446 B2 | 6/2014 | Li et al. |
| 8,936,740 B2 | 1/2015 | Topolkaraev et al. |
| 8,980,964 B2 | 3/2015 | Topolkaraev et al. |
| 9,040,598 B2 | 5/2015 | Scholl et al. |
| 9,518,181 B2 | 12/2016 | Scholl et al. |
| 2002/0081423 A1 | 6/2002 | Heffelfinger |
| 2002/0122828 A1 | 9/2002 | Liu |
| 2003/0113528 A1 | 6/2003 | Moya |
| 2003/0180525 A1 | 9/2003 | Strack |
| 2004/0002273 A1 | 1/2004 | Fitting et al. |
| 2004/0078015 A1 | 4/2004 | Copat et al. |
| 2004/0170852 A1 | 9/2004 | Gustafson |
| 2005/0054255 A1 | 3/2005 | Morman et al. |
| 2005/0112363 A1 | 5/2005 | Ning |
| 2005/0119359 A1 | 6/2005 | Shelby et al. |
| 2005/0221075 A1 | 10/2005 | Travelute, III et al. |
| 2005/0260911 A1 | 11/2005 | Ochi et al. |
| 2006/0094810 A1 | 5/2006 | Kim et al. |
| 2006/0257656 A1 | 11/2006 | Ochi et al. |

(56) References Cited

U.S. PATENT DOCUMENTS

| | | |
|---|---|---|
| 2007/0264897 A1 | 11/2007 | Collias et al. |
| 2008/0095978 A1 | 4/2008 | Siqueira et al. |
| 2008/0147165 A1 | 6/2008 | Hossainy et al. |
| 2008/0150185 A1 | 6/2008 | Topolkaraev |
| 2008/0287026 A1 | 11/2008 | Chakravarty et al. |
| 2009/0068463 A1 | 3/2009 | Mochizuki et al. |
| 2009/0069463 A1 | 3/2009 | Serizawa et al. |
| 2009/0124956 A1 | 5/2009 | Swetlin et al. |
| 2009/0274871 A1 | 11/2009 | Takahashi et al. |
| 2009/0311937 A1 | 12/2009 | He et al. |
| 2009/0326152 A1 | 12/2009 | Li et al. |
| 2010/0003882 A1 | 1/2010 | Sumi et al. |
| 2010/0048082 A1 | 2/2010 | Topolkaraev et al. |
| 2010/0056656 A1 | 3/2010 | Matsuoka et al. |
| 2010/0068484 A1 | 3/2010 | Kaufman |
| 2010/0093888 A1 | 4/2010 | Endo et al. |
| 2010/0112357 A1 | 5/2010 | Fine et al. |
| 2010/0121295 A1 | 5/2010 | Collias et al. |
| 2010/0143717 A1 | 6/2010 | Sakamoto et al. |
| 2010/0178477 A1 | 7/2010 | Jacobs |
| 2010/0304051 A1 | 12/2010 | Henschke et al. |
| 2011/0132519 A1 | 6/2011 | Li et al. |
| 2011/0183563 A1 | 7/2011 | Ochi et al. |
| 2011/0195210 A1 | 8/2011 | Li et al. |
| 2011/0212179 A1 | 9/2011 | Liu |
| 2011/0262683 A1 | 10/2011 | Mochizuki et al. |
| 2012/0040185 A1 | 2/2012 | Topolkaraev et al. |
| 2012/0040582 A1 | 2/2012 | Topolkaraev et al. |
| 2012/0164905 A1 | 6/2012 | Topolkaraev et al. |
| 2012/0214944 A1 | 8/2012 | Li et al. |
| 2012/0225272 A1 | 9/2012 | Costeux et al. |
| 2012/0231242 A1 | 9/2012 | Boyer et al. |
| 2012/0315454 A1 | 12/2012 | Wang et al. |
| 2012/0321856 A1 | 12/2012 | Afshari |
| 2013/0118981 A1 | 5/2013 | Vogel et al. |
| 2013/0209770 A1 | 8/2013 | Topolkaraev |
| 2013/0210308 A1 | 8/2013 | McEneany et al. |
| 2013/0210621 A1 | 8/2013 | Topolkaraev et al. |
| 2013/0210949 A1 | 8/2013 | Scholl et al. |
| 2013/0210983 A1 | 8/2013 | Topolkaraev et al. |
| 2014/0044954 A1 | 2/2014 | Matsubara |
| 2014/0170922 A1 | 6/2014 | Poruthoor et al. |
| 2015/0159012 A1 | 6/2015 | Topolkaraev et al. |
| 2016/0108194 A1 | 4/2016 | Topolkaraev et al. |
| 2016/0108564 A1 | 4/2016 | Topolkaraev et al. |
| 2016/0122491 A1 | 5/2016 | Topolkaraev et al. |
| 2016/0177048 A1* | 6/2016 | Topolkaraev et al. .. B29C 44/04 521/134 |
| 2016/0193157 A1 | 7/2016 | Topolkaraev et al. |

OTHER PUBLICATIONS

International Search Report & Written Opinion for PCT/IB2014/062036, dated Oct. 24, 2014, 12 pages.

\* cited by examiner

US 9,957,366 B2

TECHNIQUE FOR SELECTIVELY CONTROLLING THE POROSITY OF A POLYMERIC MATERIAL

RELATED APPLICATIONS

The present application is the national stage entry of International Patent Application No. PCT/IB2014/062036 having a filing date of Jun. 6, 2014, which claims priority to U.S. provisional application Ser. Nos. 61/863,933, filed on Aug. 9, 2013, and 61/907,602, filed on Nov. 22, 2013, which are incorporated herein in their entirety by reference thereto.

BACKGROUND OF THE INVENTION

Significant efforts have been made to produce porous polymeric materials to improve the use of natural resources and reduction of the carbon footprint in finished products. A typical approach to initiating pore formation in polymeric materials is by foaming the polymer using physical or chemical blowing agents, which create gas-filled pores though the bulk. Chemical blowing agents are compounds that undergo chemical reaction liberating gas that creates the pore structure through the bulk of the polymer. Physical blowing agents are typically compressed gases that are dispersed in the polymer and expand creating the pores. Regardless, typical foaming processes induce low molecular orientation because the pore formation happens when the polymer is in the molten state. This reduces the melt strength, thus leading to breaks in high speed production processes with high deformation rates (e.g., fiber spinning, film formation, molding, etc.). Another problem with such materials is that, even if they can be successfully manufactured, they tend to be stiff and thus difficult to manipulate into different shapes during use of the material.

As such, a need currently exists for an improved technique for creating pores in polymeric materials.

SUMMARY OF THE INVENTION

In accordance with one embodiment of the present invention, a method for controlling the degree of porosity in a polymeric material is disclosed. The material is formed from a thermoplastic composition containing a microinclusion additive and nanoinclusion additive that are dispersed within a continuous phase of a matrix polymer in the form of discrete domains, and at least a portion of the polymeric material is strained so that a porous network is formed therein. The method comprises heat treating at least a portion of the strained polymeric material, wherein the heat treated material exhibits a lower pore volume than the material prior to heat treatment.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
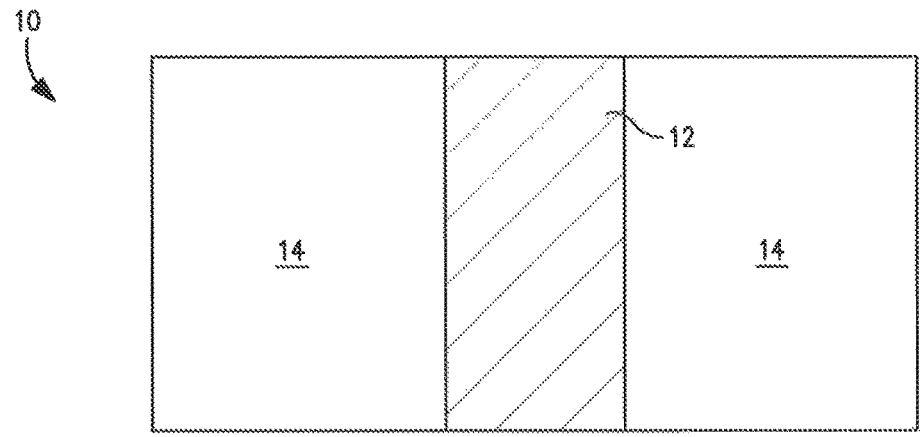
FIG. 1 schematically illustrates one embodiment of a polymeric material that may be formed in accordance with the present invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a technique for selectively controlling the porosity in a polymeric material. The polymeric material is formed from a thermoplastic composition containing a microinclusion additive and nanoinclusion additive dispersed within a continuous phase that includes a matrix polymer. To initiate pore formation, at least a portion of the polymeric material is initially strained (e.g., bending, stretching, twisting, etc.) to impart energy at the interface of the continuous phase and inclusion additives, which enables them to separate from the interface to create a porous network. The material may also be strained in a solid state in the sense that it is kept at a temperature ("straining temperature") below the melting temperature of the matrix polymer. Among other things, this helps to ensure that the polymer chains are not altered to such an extent that the porous network becomes unstable. For example, the material may be strained at a temperature of from about −50° C. to about 125° C., in some embodiments from about −25° C. to about 100° C., and in some embodiments, from about −20° C. to about 50° C. The straining temperature may also be below the glass transition temperature of the component having the highest glass transition temperature (e.g., matrix polymer, microinclusion additive, etc.). For example, the straining temperature may be at least about 10° C., in some embodiments at least about 20° C., and in some embodiments, at least about 30° C. below the glass transition temperature of the matrix polymer and/or microinclusion additive.

The microinclusion and nanoinclusion additives may also be selected so that they are at least partially incompatible with the matrix polymer so that they become dispersed within the continuous phase as discrete micro-scale and nano-scale phase domains, respectively. Thus, when the composition is subjected to a deformation and elongational strain, intensive localized shear regions and/or stress intensity regions (e.g., normal stresses) can form near the micro-scale discrete phase domains as a result of stress concentrations that arise from the incompatibility of the materials. These shear and/or stress intensity regions may cause some initial debonding in the polymer matrix adjacent to the micro-scale domains. Notably, however, localized shear and/or stress intensity regions may also be created near the nano-scale discrete phase domains that overlap with the micro-scale regions. Such overlapping shear and/or stress intensity regions cause even further debonding to occur in the polymer matrix, thereby creating a substantial number of nanopores adjacent to the nano-scale domains and/or micro-scale domains.

Once strained in the manner described above, a porous network is defined in the polymeric material. A substantial portion of the pores may be of a "nano-scale" size ("nanopores"), such as those having an average cross-sectional dimension of about 800 nanometers or less, in some embodiments from about 5 to about 250 nanometers, and in some embodiments, from about 10 to about 100 nanometers. The term "cross-sectional dimension" generally refers to a characteristic dimension (e.g., width or diameter) of a pore, which is substantially orthogonal to its major axis (e.g., length) and also typically substantially orthogonal to the direction of the stress applied during straining. Such nanopores may, for example, constitute about 15 vol. % or more, in some embodiments about 20 vol. % or more, in some embodiments from about 30 vol. % to 100 vol. %, and in some embodiments, from about 40 vol. % to about 90 vol. % of the total pore volume in the polymeric material.

As indicated above, the overlapping shear and/or stress intensity regions created during straining can result in the formation of pores adjacent to the nano-scale domains and/or micro-scale domains. Due to the unique nature of the material and the manner in which it is formed, the pores may become distributed within alternating banded areas between which ridges of the polymer matrix are located that extend generally perpendicular to the direction of strain. The ridges can remain relatively uncavitated and stiff. However, the polymer matrix can also form bridges in the banded areas that remain relatively flexible in nature due to the high concentration of pores therein. The combination of these features can result in a material that has structural integrity due to the presence of the rigid ridges, yet also capable of flexing and dissipating energy due to the presence of the relatively flexible bridges. Among other things, this enhances the flexibility of the material and allows it, for instance, to more readily formed using conventional manufacturing processes (e.g., fiber spinning, film formation, molding, etc.). The enhanced flexibility also allows the material to be more readily manipulated into different shapes during use of an article containing the material.

Although the polymeric material can exhibit a high degree of initial flexibility, a key benefit of the present invention is the ability to selectively reduce this flexibility when desired. For example, this may be useful when flexibility is needed to manipulate an article (e.g., pipe) into a certain shape during installation, but when rigidity is needed after the article is installed. In this regard, at least a portion of the strained polymeric material is subjected to a heat treatment process that increases its rigidity by increasing polymeric material crystallinity and reducing the size of some or all of the pores as a result of shrinkage. For example, a portion of the strained polymeric material may be heated to a temperature at or above the glass transition temperature of the polymer matrix, such as at from about 40° to about 200° C., in some embodiments from about 50° C. to about 150° C., and in some embodiments, from about 70° C. to about 120° C. At such temperatures, the polymer will begin to flow and potentially crystallize to cause the pores to destabilize and reduce in size.

Figure 2:
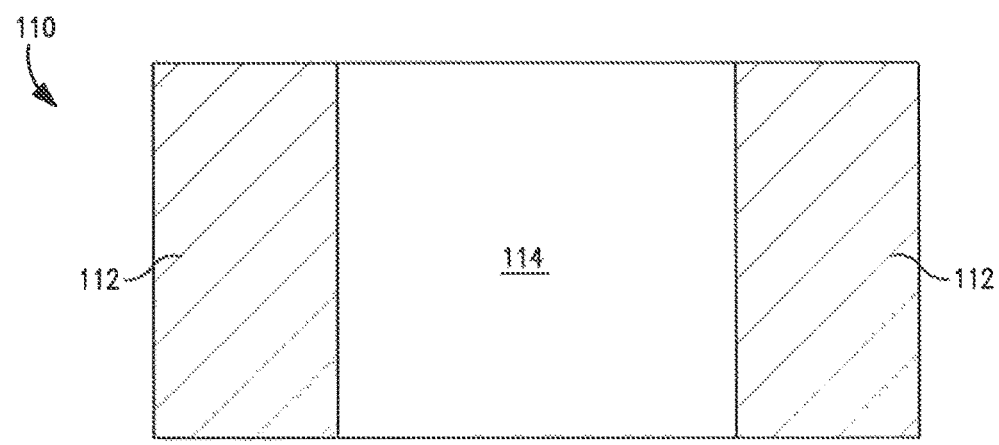
FIG. 2 schematically illustrates another embodiment of a polymeric material that may be formed in accordance with the present invention.

If desired, the entire polymeric material may be treated in the manner described above to increase rigidity. Alternatively, only certain portions of the material may be treated such that the material contains multiple zones, one or more of which (e.g., "first zones") remain untreated and thus have a certain degree of porosity, while one or more of which (e.g., "second zones") are heated treated and thus have a lesser degree of porosity. Typically, at least one of the first zones is contiguous to at least one of the second zones. Nevertheless, the particular configuration, shape, and/or size of the first and second zones are not critical and generally depend on the particular application and properties. For exemplary purposes only, FIG. 1 shows one particular embodiment of a polymeric material 10 in which an untreated first zone 12 is disposed between and contiguous to heated treated second zones 14. FIG. 2 shows yet another embodiment of a polymeric material 110 in which a heat treated second zone 114 is disposed between and contiguous to untreated first zones 112.

Regardless of the particular areas that are treated, the average percent volume occupied by the pores within a given unit volume of the material prior to or without treatment (e.g., first zone(s)) is typically greater than that of the material after treatment (e.g., second zone(s)). For example, the average pore volume prior to treatment or within an untreated first zone may be about 15% to about 80% per $cm^3$, in some embodiments from about 20% to about 70%, and in some embodiments, from about 30% to about 60% per cubic centimeter of the material. Comparatively, the material after heat treatment (e.g., within a second zone) may in some cases lack pores or have a lower pore volume, such as less than about 40%, in some embodiments less than about 30%, and in some embodiments, from 5% to about 25%. The ratio of the density prior to treatment or within an untreated first zone to the density after treatment may likewise be about 0.1 to about 0.95, in some embodiments from about 0.2 to about 0.9, and in some embodiments, from about 0.3 to about 0.8. For example, the density prior to treatment or within an untreated first zone may be about 1.2 grams per cubic centimeter ("$g/cm^3$") or less, in some embodiments about 1.0 $g/cm^3$ or less, in some embodiments from about 0.2 $g/cm^3$ to about 0.8 $g/cm^3$, and in some embodiments, from about 0.1 $g/cm^3$ to about 0.6 $g/cm^3$, while the density after treatment may be greater than about 0.6 $g/cm^3$, in some embodiments greater than about 0.7 $g/cm^3$, in some embodiments greater than about 0.8 $g/cm^3$, and in some embodiments, greater than about 1 $g/cm^3$.

Due to the reduction of pore volumes and potential increase in crystallinity after heat treatment, at least a portion of the material can exhibit an enhanced degree of rigidity. Namely, the ratio of the modulus of elasticity in the material prior to treatment or within an untreated first zone to the modulus after treatment (e.g., within a second zone)

may be about 0.1 to about 0.95, in some embodiments from about 0.2 to about 0.9, and in some embodiments, from about 0.3 to about 0.8. For example, the modulus of elasticity prior to treatment or within an untreated first zone may be about 2500 Megapascals ("MPa") or less, in some embodiments about 2200 MPa or less, in some embodiments from about 50 MPa to about 2000 MPa, and in some embodiments, from about 100 MPa to about 1000 MPa, while the modulus of elasticity after treatment may be greater than about 1000 MPa, in some embodiments greater than about 1500 MPa, and in some embodiments, greater than about 2500 MPa, such as determined in accordance with ASTM D638-10 at 23° C.

Various embodiments of the present invention will now be described in more detail.

I. Thermoplastic Composition

A. Matrix Polymer

As indicated above, the thermoplastic composition contains a continuous phase within which the microinclusion and nanoinclusion additives are dispersed. The continuous phase contains one or more matrix polymers, which typically constitute from about 60 wt. % to about 99 wt. %, in some embodiments from about 75 wt. % to about 98 wt. %, and in some embodiments, from about 80 wt. % to about 95 wt. % of the thermoplastic composition. The nature of the matrix polymer(s) used to form the continuous phase is not critical and any suitable polymer may generally be employed, such as polyesters, polyolefins, styrenic polymers, polyamides, etc. In certain embodiments, for example, polyesters may be employed in the composition to form the polymer matrix. Any of a variety of polyesters may generally be employed, such as aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

In certain cases, the thermoplastic composition may contain at least one polyester that is rigid in nature and thus has a relatively high glass transition temperature. For example, the glass transition temperature ("$T_g$") may be about 0° C. or more, in some embodiments from about 5° C. to about 100° C., in some embodiments from about 30° C. to about 80° C., and in some embodiments, from about 50° C. to about 75° C. The polyester may also have a melting temperature of from about 140° C. to about 300° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

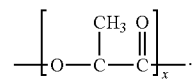

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458.

The polylactic acid typically has a number average molecular weight ("$M_n$") ranging from about 40,000 to about 180,000 grams per mole, in some embodiments from about 50,000 to about 160,000 grams per mole, and in some embodiments, from about 80,000 to about 120,000 grams per mole. Likewise, the polymer also typically has a weight average molecular weight ("$M_w$") ranging from about 80,000 to about 250,000 grams per mole, in some embodiments from about 100,000 to about 200,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Some types of neat polyesters (e.g., polylactic acid) can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the polyester have a moisture content of about 300 parts per million ("ppm") or less, in some embodiments about 200 ppm or less, in some embodiments from about 1 to about 100 ppm prior to blending with the microinclusion and nanoinclusion additives. Drying of the polyester may occur, for instance, at a temperature of from about 50° C. to about 100° C., and in some embodiments, from about 70° C. to about 80° C.

B. Microinclusion Additive

As used herein, the term "microinclusion additive" generally refers to any amorphous, crystalline, or semi-crystalline material that is capable of being dispersed within the polymer matrix in the form of discrete domains of a micro-scale size. For example, prior to straining, the domains may have an average cross-sectional dimension of from about 0.05 µm to about 30 µm, in some embodiments from about 0.1 µm to about 25 µm, in some embodiments from about 0.5 µm to about 20 µm, and in some embodiments from about 1 µm to about 10 µm. The term "cross-sectional dimension" generally refers to a characteristic dimension (e.g., width or diameter) of a domain, which is substantially orthogonal to its major axis (e.g., length) and also typically substantially orthogonal to the direction of the stress applied during straining. While typically formed from the microinclusion additive, it should be also understood that the micro-scale domains may also be formed from a combination of the microinclusion and nanoinclusion additives and/or other components of the composition.

The microinclusion additive is generally polymeric in nature and possesses a relatively high molecular weight to help improve the melt strength and stability of the thermoplastic composition. Typically, the microinclusion polymer may be generally immiscible with the matrix polymer. In this manner, the additive can better become dispersed as discrete phase domains within a continuous phase of the matrix polymer. The discrete domains are capable of absorbing energy that arises from an external force, which increases the overall toughness and strength of the resulting material. The domains may have a variety of different shapes, such as elliptical, spherical, cylindrical, plate-like, tubular, etc. In one embodiment, for example, the domains have a substantially elliptical shape. The physical dimension of an individual domain is typically small enough to minimize the propagation of cracks through the polymeric material upon the application of an external stress, but large enough to initiate microscopic plastic deformation and allow for shear and/or stress intensity zones at and around particle inclusions.

While the polymers may be immiscible, the microinclusion additive may nevertheless be selected to have a solubility parameter that is relatively similar to that of the matrix polymer. This can improve the interfacial compatibility and physical interaction of the boundaries of the discrete and continuous phases, and thus reduces the likelihood that the composition will fracture. In this regard, the ratio of the solubility parameter for the matrix polymer to that of the additive is typically from about 0.5 to about 1.5, and in some embodiments, from about 0.8 to about 1.2. For example, the microinclusion additive may have a solubility parameter of from about 15 to about 30 MJoules$^{1/2}$/m$^{3/2}$, and in some embodiments, from about 18 to about 22 MJoules$^{1/2}$/m$^{3/2}$, while polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{((\Delta H_v - RT)/V_m)}$$

where:
$\Delta H_v$ = heat of vaporization
R = Ideal Gas constant
T = Temperature
$V_m$ = Molecular Volume The Hildebrand solubility parameters for many polymers are also available from the Solubility Handbook of Plastics, by Wyeych (2004), which is incorporated herein by reference.

The microinclusion additive may also have a certain melt flow rate (or viscosity) to ensure that the discrete domains and resulting pores can be adequately maintained. For example, if the melt flow rate of the additive is too high, it tends to flow and disperse uncontrollably through the continuous phase. This results in lamellar, plate-like domains or co-continuous phase structures that are difficult to maintain and also likely to prematurely fracture. Conversely, if the melt flow rate of the additive is too low, it tends to clump together and form very large elliptical domains, which are difficult to disperse during blending. This may cause uneven distribution of the additive through the entirety of the continuous phase. In this regard, the present inventors have discovered that the ratio of the melt flow rate of the microinclusion additive to the melt flow rate of the matrix polymer is typically from about 0.2 to about 8, in some embodiments from about 0.5 to about 6, and in some embodiments, from about 1 to about 5. The microinclusion additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the microinclusion additive may also be selected to achieve the desired porous network. For example, when a blend of the matrix polymer and microinclusion additive is applied with an external force, stress concentrations (e.g., including normal or shear stresses) and shear and/or plastic yielding zones may be initiated at and around the discrete phase domains as a result of stress concentrations that arise from a difference in the elastic modulus of the additive and matrix polymer. Larger stress concentrations promote more intensive localized plastic flow at the domains, which allows them to become significantly elongated when stresses are imparted. These elongated domains can allow the composition to exhibit a more pliable and softer behavior than the matrix polymer, such as when it is a rigid polyester resin. To enhance the stress concentrations, the microinclusion additive may be selected to have a relatively low Young's modulus of elasticity in comparison to the matrix polymer. For example, the ratio of the modulus of elasticity of the matrix polymer to that of the additive is typically from about 1 to about 250, in some embodiments from about 2 to about 100, and in some embodiments, from about 2 to about 50. The modulus of elasticity of the microinclusion additive may, for instance, range from about 2 to about 1000 Megapascals (MPa), in some embodiments from about 5 to about 500 MPa, and in some embodiments, from about 10 to about 200 MPa. To the contrary, the modulus of elasticity of polylactic acid, for example, is typically from about 800 MPa to about 3000 MPa.

While a wide variety of microinclusion additives may be employed that have the properties identified above, particularly suitable examples of such additives may include synthetic polymers, such as polyolefins (e.g., polyethylene, polypropylene, polybutylene, etc.); styrenic copolymers (e.g., styrene-butadiene-styrene, styrene-isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Suitable polypropylene homopolymers may likewise include Exxon Mobil 3155 polypropylene, Exxon Mobil Achieve™ resins, and Total M3661 PP resin. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi. et al.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the microinclusion additive in the thermoplastic composition is selected to achieve the desired properties without significantly impacting the base properties of the composition. For example, the microinclusion additive is typically employed in an amount of from about 1 wt. % to about 30 wt. %, in some embodiments from about 2 wt. % to about 25 wt. %, and in some embodiments, from about 5 wt. % to about 20 wt. % of the thermoplastic composition, based on the weight of the continuous phase (matrix polymer(s)). The concentration of the microinclusion additive in the entire thermoplastic composition may likewise constitute from about 0.1 wt. % to about 30 wt. %, in some embodiments from about 0.5 wt. % to about 25 wt. %, and in some embodiments, from about 1 wt. % to about 20 wt. %.

C. Nanoinclusion Additive

As used herein, the term "nanoinclusion additive" generally refers to any amorphous, crystalline, or semi-crystalline material that is capable of being dispersed within the polymer matrix in the form of discrete domains of a nano-scale size. For example, prior to straining, the domains may have an average cross-sectional dimension of from about 1 to about 1000 nanometers, in some embodiments from about 5 to about 800 nanometers, in some embodiments from about 10 to about 500 nanometers, and in some embodiments from about 20 to about 200 nanometers. It should be also understood that the nano-scale domains may also be formed from a combination of the microinclusion and nanoinclusion additives and/or other components of the composition. The nanoinclusion additive is typically employed in an amount of from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the nanoinclusion additive in the entire thermoplastic composition may likewise be from about 0.01 wt. % to about 15 wt. %, in some embodiments from about 0.05 wt. % to about 10 wt. %, and in some embodiments, from about 0.3 wt. % to about 6 wt. % of the thermoplastic composition.

The nanoinclusion additive may be polymeric in nature and possess a relatively high molecular weight to help improve the melt strength and stability of the thermoplastic composition. To enhance its ability to become dispersed into nano-scale domains, the nanoinclusion additive may also be selected from materials that are generally compatible with the matrix polymer and the microinclusion additive. This may be particularly useful when the matrix polymer or the microinclusion additive possesses a polar moiety, such as a polyester. One example such a nanoinclusion additive is a functionalized polyolefin. The polar component may, for example, be provided by one or more functional groups and the non-polar component may be provided by an olefin. The olefin component of the nanoinclusion additive may generally be formed from any linear or branched α-olefin monomer, oligomer, or polymer (including copolymers) derived from an olefin monomer, such as described above.

The functional group of the nanoinclusion additive may be any group, molecular segment and/or block that provides a polar component to the molecule and is not compatible with the matrix polymer. Examples of molecular segment and/or blocks not compatible with polyolefin may include acrylates, styrenics, polyesters, polyamides, etc. The functional group can have an ionic nature and comprise charged metal ions. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

In certain embodiments, the nanoinclusion additive may also be reactive. One example of such a reactive nanoinclusion additive is a polyepoxide that contains, on average, at least two oxirane rings per molecule. Without intending to be limited by theory, it is believed that such polyepoxide molecules can induce reaction of the matrix polymer (e.g., polyester) under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of a polyester (esterification) or via a hydroxyl group (etherification). Oxazoline side reactions may likewise occur to form esteramide moieties. Through such reactions, the molecular weight of the matrix polymer may be increased to counteract the degradation often observed during melt processing. While it may be desirable to induce a reaction with the matrix polymer as described above, the present inventors have discovered that too much of a reaction can lead to crosslinking between polymer backbones. If such crosslinking is allowed to proceed to a significant extent, the resulting polymer blend can become brittle and difficult to process into a material with the desired strength and elongation properties.

In this regard, the present inventors have discovered that polyepoxides having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it may not only result in chain extension, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide is a terpolymer formed from an epoxy-functional (meth)acrylic monomeric component, α-olefin monomeric component, and non-epoxy functional (meth)acrylic monomeric component. For example, the polyepoxide may be poly(ethylene-co-methylacrylate-co-glycidyl methacrylate), which has the following structure:

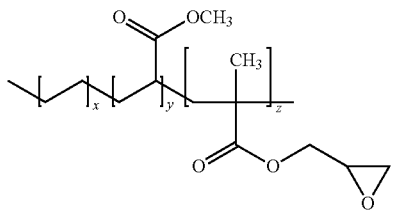

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the polyepoxide adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %. Another suitable polyepoxide is commercially available from DuPont under the name ELVALOY® PTW, which is a terpolymer of ethylene, butyl acrylate, and glycidyl methacrylate and has a melt flow rate of 12 g/10 min.

In addition to controlling the type and relative content of the monomers used to form the polyepoxide, the overall weight percentage may also be controlled to achieve the desired benefits. For example, if the modification level is too low, the desired increase in melt strength and mechanical properties may not be achieved. The present inventors have also discovered, however, that if the modification level is too high, processing may be restricted due to strong molecular interactions (e.g., crosslinking) and physical network formation by the epoxy functional groups. Thus, the polyepoxide is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the matrix polymer employed in the composition. The polyepoxide may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

Other reactive nanoinclusion additives may also be employed in the present invention, such as oxazoline-functionalized polymers, cyanide-functionalized polymers, etc. When employed, such reactive nanoinclusion additives may be employed within the concentrations noted above for the polyepoxide. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof.

Nanofillers may also be employed, such as carbon black, carbon nanotubes, carbon nanofibers, nanoclays, metal nanoparticles, nanosilica, nanoalumina, etc. Nanoclays are particularly suitable. The term "nanoclay" generally refers to nanoparticles of a clay material (a naturally occurring mineral, an organically modified mineral, or a synthetic nanomaterial), which typically have a platelet structure. Examples of nanoclays include, for instance, montmorillonite (2:1 layered smectite clay structure), bentonite (aluminium phyllosilicate formed primarily of montmorillonite), kaolinite (1:1 aluminosilicate having a platy structure and empirical formula of $Al_2Si_2O_5(OH)_4$), halloysite (1:1 aluminosilicate having a tubular structure and empirical formula of $Al_2Si_2O_5(OH)_4$), etc. An example of a suitable nanoclay is Cloisite®, which is a montmorillonite nanoclay and commercially available from Southern Clay Products, Inc. Other examples of synthethic nanoclays include but are not limited to a mixed-metal hydroxide nanoclay, layered double hydroxide nanoclay (e.g., sepiocite), laponite, hectorite, saponite, indonite, etc.

If desired, the nanoclay may contain a surface treatment to help improve compatibility with the matrix polymer (e.g., polyester). The surface treatment may be organic or inorganic. In one embodiment, an organic surface treatment is employed that is obtained by reacting an organic cation with the clay. Suitable organic cations may include, for instance, organoquatemary ammonium compounds that are capable of exchanging cations with the clay, such as dimethyl bis[hydrogenated tallow]ammonium chloride (2M2HT), methyl benzyl bis[hydrogenated tallow]ammonium chloride (MB2HT), methyl tris[hydrogenated tallow alkyl]chloride (M3HT), etc. Examples of commercially available organic nanoclays may include, for instance, Dellite® 43B (Laviosa Chimica of Livomo, Italy), which is a montmorillonite clay modified with dimethyl benzylhydrogenated tallow ammonium salt. Other examples include Cloisite® 25A and Cloisite® 30B (Southern Clay Products) and Nanofil 919 (Süd Chemie). If desired, the nanofiller can be blended with a carrier resin to form a masterbatch that enhances the compatibility of the additive with the other polymers in the composition. Particularly suitable carrier resins include, for instance, polyesters (e.g., polylactic acid, polyethylene terephthalate, etc.); polyolefins (e.g., ethylene polymers, propylene polymers, etc.); and so forth, as described in more detail above.

In certain embodiments of the present invention, multiple nanoinclusion additives may be employed in combination. For instance, a first nanoinclusion additive (e.g., polyepoxide) may be dispersed in the form of domains having an average cross-sectional dimension of from about 50 to about 500 nanometers, in some embodiments from about 60 to about 400 nanometers, and in some embodiments from about 80 to about 300 nanometers. A second nanoinclusion additive (e.g., nanofiller) may also be dispersed in the form of domains that are smaller than the first nanoinclusive additive, such as those having an average cross-sectional dimension of from about 1 to about 50 nanometers, in some embodiments from about 2 to about 45 nanometers, and in some embodiments from about 5 to about 40 nanometers. When employed, the first and/or second nanoinclusion additives typically constitute from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the first and/or second nanonclusion additives in the entire thermoplastic composition may likewise be from about 0.01 wt. % to about 15 wt. %, in some embodiments from about 0.05 wt. % to about 10 wt. %, and in some embodiments, from about 0.1 wt. % to about 8 wt. % of the thermoplastic composition.

D. Other Components

A wide variety of ingredients may be employed in the composition for a variety of different reasons. For instance, in one particular embodiment, an interphase modifier may be employed in the thermoplastic composition to help reduce the degree of friction and connectivity between the microinclusion additive and matrix polymer, and thus enhance the degree and uniformity of debonding. In this manner, the pores can become distributed in a more homogeneous fashion throughout the composition. The modifier may be in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the microinclusion additive, for example, resulting in a change in the interfacial tension between the matrix polymer and the additive. By reducing physical forces at the interfaces between the matrix polymer and the microinclusion additive, it is believed that the low viscosity, hydrophobic nature of the modifier can help facilitate debonding. As used herein, the term "hydrophobic" typically refers to a material having a contact angle of water in air of about 40° or more, and in some cases, about 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, fatty acid amides (e.g., oleamide, erucamide, stearamide, ethylene bis(stearamide), etc.), mineral, and vegetable oils, and so forth. One particularly suitable liquid or semi-solid is polyether polyol, such as commercially available under the trade name Pluriol® WI from BASF Corp. Another suitable modifier is a partially renewable ester, such as commercially available under the trade name HALLGREEN® IM from Hallstar.

When employed, the interphase modifier may constitute from about 0.1 wt. % to about 20 wt. %, in some embodiments from about 0.5 wt. % to about 15 wt. %, and in some embodiments, from about 1 wt. % to about 10 wt. % of the thermoplastic composition, based on the weight of the continuous phase (matrix polymer(s)). The concentration of the interphase modifier in the entire thermoplastic composition may likewise constitute from about 0.05 wt. % to about 20 wt. %, in some embodiments from about 0.1 wt. % to about 15 wt. %, and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial matrix polymer. In this regard, the ratio of the glass temperature of the composition to that of the matrix polymer is typically from about 0.7 to about 1.3, in some embodiments from about 0.8 to about 1.2, and in some embodiments, from about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt flow rate of the thermoplastic composition may also be similar to that of the matrix polymer. For example, the melt flow rate of the composition (on a dry basis) may be from about 0.1 to about 70 grams per 10 minutes, in some embodiments from about 0.5 to about 50 grams per 10 minutes, and in some embodiments, from about 5 to about 25 grams per 10 minutes, determined at a load of 2160 grams and at a temperature of 190° C.

Compatibilizers may also be employed that improve interfacial adhesion and reduce the interfacial tension between the domain and the matrix, thus allowing the formation of smaller domains during mixing. Examples of suitable compatibilizers may include, for instance, copolymers functionalized with epoxy or maleic anhydride chemical moieties. An example of a maleic anhydride compatibilizer is polypropylene-grafted-maleic anhydride, which is commercially available from Arkema under the trade names Orevac™ 18750 and Orevac™ CA 100. When employed, compatibilizers may constitute from about 0.05 wt. % to about 10 wt. %, in some embodiments from about 0.1 wt. % to about 8 wt. %, and in some embodiments, from about 0.5 wt. % to about 5 wt. % of the thermoplastic composition, based on the weight of the continuous phase matrix.

Other suitable materials that may also be used in the thermoplastic composition, such as catalysts, antioxidants, stabilizers, surfactants, waxes, solid solvents, fillers, nucleating agents (e.g., calcium carbonate, etc.), particulates, and other materials added to enhance the processability and mechanical properties of the thermoplastic composition. Nevertheless, one beneficial aspect of the present invention is that good properties may be provided without the need for various conventional additives, such as blowing agents (e.g., chlorofluorocarbons, hydrochlorofluorocarbons, hydrocarbons, carbon dioxide, supercritical carbon dioxide, nitrogen, etc.) and plasticizers (e.g., solid or semi-solid polyethylene glycol). In fact, the thermoplastic composition may be generally free of blowing agents and/or plasticizers. For example, blowing agents and/or plasticizers may be present in an amount of no more than about 1 wt. %, in some embodiments no more than about 0.5 wt. %, and in some embodiments, from about 0.001 wt. % to about 0.2 wt. % of the thermoplastic composition. Further, due to its stress whitening properties, as described in more detail below, the resulting composition may achieve an opaque color (e.g., white) without the need for conventional pigments, such as titanium dioxide. In certain embodiments, for example, pigments may be present in an amount of no more than about 1 wt. %, in some embodiments no more than about 0.5 wt. %, and in some embodiments, from about 0.001 wt. % to about 0.2 wt. % of the thermoplastic composition.

II. Blending

To form the thermoplastic composition, the components are typically blended together using any of a variety of known techniques. In one embodiment, for example, the components may be supplied separately or in combination. For instance, the components may first be dry mixed together to form an essentially homogeneous dry mixture, and they may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the components may be fed to the same or different feeding ports of the twin-screw extruder and melt blended to form a substantially homogeneous melted mixture. If desired, other additives may also be injected into the polymer melt and/or separately fed into the extruder at a different point along its length.

Regardless of the particular processing technique chosen, the resulting melt blended composition typically contains micro-scale domains of the microinclusion additive and nano-scale domains of the nanoinclusion additive as described above. The degree of shear/pressure and heat may be controlled to ensure sufficient dispersion, but not so high as to adversely reduce the size of the domains so that they are incapable of achieving the desired properties. For example, blending typically occurs at a temperature of from about 180° C. to about 300° C., in some embodiments from about 185° C. to about 250° C., and in some embodiments, from about 190° C. to about 240° C. Likewise, the apparent shear rate during melt processing may range from about 10 seconds$^{-1}$ to about 3000 seconds$^{-1}$, in some embodiments from about 50 seconds$^{-1}$ to about 2000 seconds$^{-1}$, and in some embodiments, from about 100 seconds$^{-1}$ to about 1200 seconds$^{-1}$. The apparent shear rate may be equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 600 revolutions per minute ("rpm"), in some embodiments from about 70 to about 500 rpm, and in some embodiments, from about 100 to about 300 rpm. This may result in a temperature that is sufficient high to disperse the microinclusion additive without adversely impacting the size of the resulting domains. The melt shear rate, and in turn the degree to which the additives are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

III. Pore Initiation

Once formed, the material is then subjected to a deformational strain as described above to create the initial porous network. This may be accomplished by straining or drawing the material in the longitudinal direction (e.g., machine direction), transverse direction (e.g., cross-machine direction), etc., as well as combinations thereof. If desired, the thermoplastic composition may be formed into a precursor shape, strained, and thereafter converted into the desired material (e.g., film, fiber, etc.). In one embodiment, the precursor shape may be a film having a thickness of from about 1 to about 5000 micrometers, in some embodiments from about 2 to about 4000 micrometers, in some embodiments from about 5 to about 2500 micrometers, and in some embodiments, from about 10 to about 500 micrometers. As an alternative to forming a precursor shape, the thermoplastic composition may also be strained in situ as it is being shaped into the desired form for the polymeric material. In one embodiment, for example, the thermoplastic composition may be strained as it is being formed into a film or fiber.

Various techniques may be employed. One suitable straining technique, for instance, is a nip roll process in which the material is passed between a nip defined between two rolls, at least one of which is rotatable. In one embodiment, at least one of the rolls contains a pattern of raised embossing elements, which can create a local deformation in the material. The other roll may likewise be patterned or smooth (e.g., anvil roll). If the deformed areas are stressed to a level above the cavitational yield stress, these areas can form initial pores. When subjected to further stress, the pores areas will grow in size before the remaining material cavitates. The overall embossing pattern may be selectively controlled to achieve the desired pore formation. In one embodiment, for example, an embossing pattern is selected in which the longitudinal axis (longest dimension along a center line of the element) of one or more of the elements is skewed relative to the machine direction ("MD") of the elastic film. For example, one or more of the embossing elements may be oriented from about 30° to about 150°, in some embodiments from about 45° to about 135°, and in some embodiments, from about 60° to about 120° relative to the machine direction of the polymeric material. In this manner, the embossing elements will present a relatively large surface to the material in a direction substantially perpendicular to that which it moves. This increases the area over which shear stress is imparted and, in turn, facilitates pore formation. The pattern of the embossing elements is generally selected so that the polymeric material has a total embossing area of less than about 50% (as determined by conventional optical microscopic methods), and in some embodiments, less than about 30%.

Figure 3:
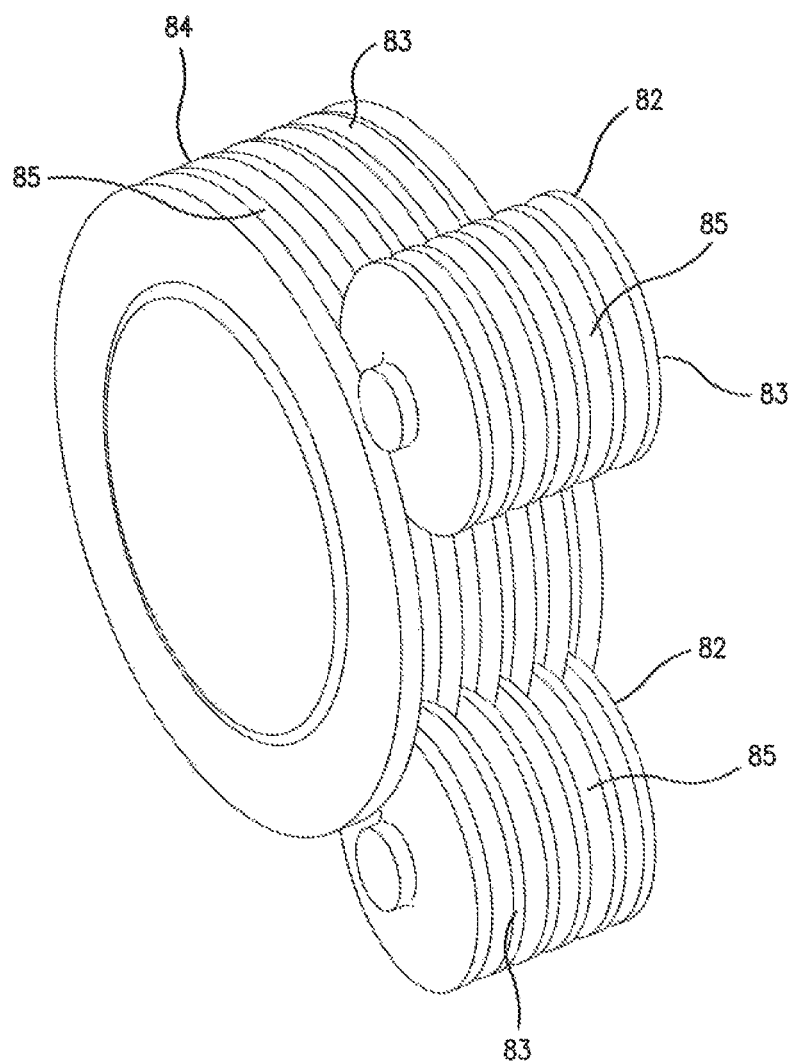
FIG. 3 is a perspective view of grooved rolls that may be used to strain a polymeric material in accordance with one embodiment of the present invention.
Figure 4:
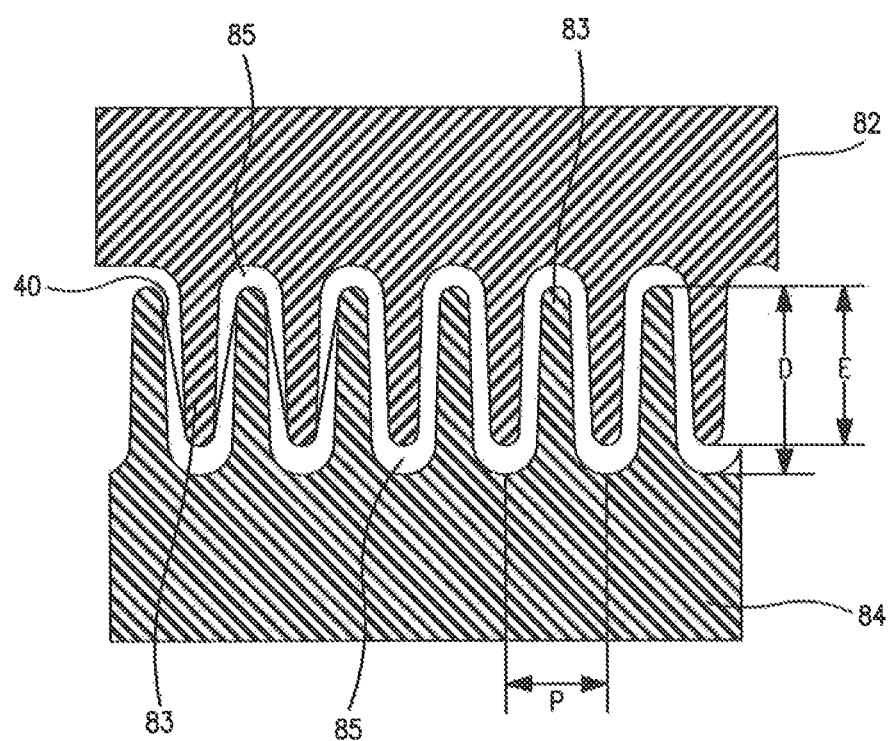
FIG. 4 is a cross-sectional view showing the engagement between two of the grooved rolls of FIG. 3.

Another suitable nip roll process involves the use of a grooved roll through which the polymeric material is able to course. Referring to FIGS. 3-4, for instance, one embodiment of a grooved roll process is shown in which a polymeric material 40 (FIG. 4) may be strained using satellite rolls 82 that engage an anvil roll 84. Specifically, the polymeric material 40 is passed through a nip formed between each satellite roll 82 and the anvil roll 84 so that the polymeric material 40 is mechanically (incrementally) stretched in a cross-machine direction. The satellite rolls 82 and anvil roll 84 include a plurality of ridges 83 defining a plurality of grooves 85 positioned across the grooved rolls in the cross-machine direction. The grooves 85 are generally oriented perpendicular to the direction of stretch of the material. In other words, the grooves 85 are oriented in the machine direction to stretch the polymeric material 40 in the cross-machine direction. The grooves 85 may likewise be oriented in the cross-machine direction to stretch the polymeric material 40 in the machine direction. The ridges 83 of satellite roll 82 intermesh with the grooves 85 of anvil roll 84, and the grooves 85 of satellite roll 82 intermesh with the ridges 83 of anvil roll 84.

The dimensions and parameters of the grooves 85 and ridges 83 may have a substantial impact on the degree of pore initiation provided by the rolls 82 and 84. For example, the number of grooves 85 contained on a roll may generally range from about 3 and 15 grooves per inch, in some embodiments from about 5 and 12 grooves per inch, and in some embodiments, from about 5 and 10 grooves per inch. The grooves 85 may also have a certain depth "D", which generally ranges from about 0.25 to about 1.0 centimeter, and in some embodiments, from about 0.4 to about 0.6 centimeters. In addition, the peak-to-peak distance "P" between the grooves 85 is typically from about 0.1 to about 0.9 centimeters, and in some embodiments, from about 0.2 to about 0.5 centimeters. Also, the groove roll engagement distance "E" between the grooves 85 and ridges 83 may be up to about 0.8 centimeters, and in some embodiments, from about 0.15 to about 0.4 centimeters.

Besides the use of a nip, the rotational velocity of the rolls themselves may also be utilized to help impart the desired degree of mechanical stress. In one embodiment, for example, the material is passed over a series of rolls that progressively strain the material. One such suitable method for accomplishing such straining is through the use of a machine direction orienter ("MDO"). MDO units typically have a plurality of rolls (e.g., from 5 to 8) that can progressively strain and the polymeric material in the machine direction. The material may be strained in either single or multiple discrete operations. It should be noted that some of the rolls in an MDO apparatus may not be operating at progressively higher speeds. To strain the material in the manner described above, it is typically desired that the rolls of the MDO are not heated. Nevertheless, if desired, one or more rolls may be heated to a slight extent to facilitate the straining process so long as the temperature of the composition remains below the ranges noted above.

Of course, it should be understood that rotatable rolls are by no means required to strain the polymeric material. Die drawing, for instance, may be employed. In a typical die drawing process, the material is initially extruded into a precursor shape (e.g., profile) and quenched. The precursor is then drawn through a converging die while in a solid state. One particularly suitable die drawing process is pultrusion, during which the material is pulled through the die to form an engineered profile or shape determined by the shape of the die. Apart from die drawing, other straining techniques may also be employed, such as stamping, sheet drawing, blanking, flanging, coining, etc. In one embodiment, for instance, sheet drawing may be employed, such as tenter frame drawing, brake drawing, etc. For instance, the polymeric material may be strained in the form of a sheet using a mechanical, electrical, hydraulic or pneumatic brake assembly. The brake assembly may include a surface where the material is initially placed, a clamping bar, and a bending member that is lifted to create a bend in the material. More particularly, the brake assembly may include a plurality of generally c-shaped members that each present opposing clamping surfaces for receiving a polymeric material. Furthermore, a socket connection may be employed to rotatably support the bending member for bending the material disposed between the clamping surfaces. The socket connection generally includes a male portion and a female portion in sliding engagement with one another or connected by a pin hinge connection to one another. Such brake assemblies are known in the art and described in more detail in, for instance, U.S. Pat. No. 4,282,735 to Break; U.S. Pat. No. 4,557,132 to Break, and to U.S. Pat. No. 6,389,864 to Chubb.

Yet another technique for straining the polymeric material involves the use of a fluidic medium (e.g., gas) to impart the desired degree of energy and stress to the material. One such process is, for instance, aspiration, which typically involves the use of blown air to draw the material. For example, a fiber draw aspirator may be employed, such as a linear fiber aspirator of the type shown in U.S. Pat. Nos. 3,802,817 and 3,423,255. A fiber draw aspirator generally includes an elongated vertical passage through which the fibers are drawn by aspirating air entering from the sides of the passage and flowing downwardly through the passage. A heater or blower may supply the aspirating air, which causes the fibers to draw or attenuate.

Regardless of the particular technique employed, the polymeric material is typically strained (e.g., in the machine direction) to a draw ratio of from about 1.1 to about 3.5, in some embodiments from about 1.2 to about 3.0, and in some embodiments, from about 1.3 to about 2.5. The draw ratio may be determined by dividing the length of the drawn material by its length before drawing. The draw rate may also vary to help achieve the desired properties, such as within the range of from about 5% to about 1500% per minute of deformation, in some embodiments from about 20% to about 1000% per minute of deformation, and in some embodiments, from about 25% to about 850% per minute of deformation.

Straining in the manner described above can result in the formation of pores that have a "nano-scale" dimension ("nanopores"), such as an average cross-sectional dimension of about 800 nanometers or less, in some embodiments from about 5 to about 250 nanometers, and in some embodiments, from about 10 to about 100 nanometers. Micropores may also be formed at and around the micro-scale domains during drawing that have an average cross-sectional dimension of from about 0.5 to about 30 micrometers, in some embodiments from about 1 to about 20 micrometers, and in some embodiments, from about 2 micrometers to about 15 micrometers. The micropores and/or nanopores may have any regular or irregular shape, such as spherical, elongated, etc. In certain cases, the axial dimension of the micropores and/or nanopores may be larger than the cross-sectional dimension so that the aspect ratio (the ratio of the axial dimension to the cross-sectional dimension) is from about 1 to about 30, in some embodiments from about 1.1 to about 15, and in some embodiments, from about 1.2 to about 5. The "axial dimension" is the dimension in the direction of the major axis (e.g., length), which is typically in the direction of straining.

The present inventors have also discovered that the pores (e.g., micropores, nanopores, or both) can be distributed in a substantially homogeneous fashion throughout the material. For example, the pores may be distributed in columns that are oriented in a direction generally perpendicular to the direction in which a stress is applied. These columns may be generally parallel to each other across the width of the material. Without intending to be limited by theory, it is believed that the presence of such a homogeneously distributed porous network can result in a high thermal resistance as well as good mechanical properties (e.g., energy dissipation under load and impact strength). This is in stark contrast to conventional techniques for creating pores that involve the use of blowing agents, which tend to result in an uncontrolled pore distribution and poor mechanical properties. Notably, the formation of the porous network by the process described above does not necessarily result in a substantial change in the cross-sectional size (e.g., width) of the material. In other words, the material is not substantially necked, which may allow the material to retain a greater degree of strength properties.

In addition to forming a porous network, straining can also significantly increase the axial dimension of the micro-scale domains so that they have a generally linear, elongated shape. For example, the elongated micro-scale domains may have an average axial dimension that is about 10% or more, in some embodiments from about 20% to about 500%, and in some embodiments, from about 50% to about 250% greater than the axial dimension of the domains prior to drawing. The axial dimension after drawing may, for instance, range from about 0.5 to about 250 micrometers, in some embodiments from about 1 to about 100 micrometers, in some embodiments from about 2 to about 50 micrometers, and in some embodiments, from about 5 to about 25 micrometers. The micro-scale domains may also be relatively thin and thus have a small cross-sectional dimension. For instance, the cross-sectional dimension may be from about 0.05 to about 50 micrometers, in some embodiments from about 0.2 to about 10 micrometers, and in some embodiments, from 0.5 to about 5 micrometers. This may result in an aspect ratio for the micro-scale domains (the ratio of the axial dimension to the cross-sectional dimension) of from about 2 to about 150, in some embodiments from about 3 to about 100, and in some embodiments, from about 4 to about 50.

IV. Heat Treatment

As indicated above, the porous polymeric material is subjected to a heat treatment in which at least a portion of the material is heated to a temperature at or above the glass transition temperature of the polymer matrix. For example, the material may be heated to a temperature of from about 40° to about 200° C., in some embodiments from about 50°

C. to about 150° C., and in some embodiments, from about 70° C. to about 120° C. At such temperatures, the polymer will begin to flow and cause the pores to destabilize and collapse. Any of a variety of techniques may be used to apply heat to the film, such as heated rolls, oven heating, and so forth.

In addition to increasing rigidity, the heat treatment can alter other properties of the material. Notably, this can allow for portions of the polymeric material to provide selective functionality at those locations where it is most needed. In certain embodiments, for instance, certain portions of the material may be permeable to water vapors before treatment, yet generally impermeable after treatment. For example, the ratio of the water vapor transmission rate ("WVTR") before treatment or within an untreated first zone to the WVTR after treatment may be about 0.1 to about 0.95, in some embodiments from about 0.2 to about 0.9, and in some embodiments, from about 0.3 to about 0.8. The WVTR prior to treatment or within an untreated zone may be about 500 g/m²-24 hours or more, in some embodiments about 1,000 g/m²-24 hours or more, and in some embodiments, from about 3,000 to about 15,000 g/m²-24 hours, while the WVTR after treatment may be less than 500 g/m²-24 hours, such as determined in accordance with ASTM E96/96M-12, Procedure B or INDA Test Procedure IST-70.4 (01)

The polymeric material may also exhibit a relatively low thermal admittance (thermal conductivity of the material divided by its thickness and is provided in units of watts per square meter-kelvins ("W/m²K")) prior to treatment, but a relatively high admittance after treatment. For example, the ratio of the thermal admittance before treatment or within an untreated first zone to the thermal admittance after treatment may be about 0.1 to about 0.95, in some embodiments from about 0.2 to about 0.9, and in some embodiments, from about 0.3 to about 0.8. For example, the thermal admittance before treatment or within an untreated zone may be about 1000 W/m²K or less, in some embodiments from about 10 to about 800 W/m²K, in some embodiments from about 20 to about 500 W/m²K, and in some embodiments, from about 40 to about 200 W/m²K, while the thermal admittance after treatment may be more than 1000 W/m²K. The actual thickness of the polymeric material may vary, but typically ranges from about 5 micrometers to about 100 millimeters, in some embodiments from about 10 micrometers to about 50 millimeters, in some embodiments from about 200 micrometers to about 25 millimeters, and in some embodiments, from about 50 micrometers to about 5 millimeters.

IV. Articles

The polymeric material of the present invention may generally have a variety of different forms depending on the particular application, such as films, fibrous materials, molded articles, profiles, etc., as well as composites and laminates thereof. In one embodiment, for example, the polymeric material is in the form of a film or layer of a film. Multilayer films may contain from two (2) to fifteen (15) layers, and in some embodiments, from three (3) to twelve (12) layers. Such multilayer films normally contain at least one base layer and at least one additional layer (e.g., skin layer), but may contain any number of layers desired. For example, the multilayer film may be formed from a base layer and one or more skin layers, wherein the base layer and/or skin layer(s) are formed from the polymeric material of the present invention. It should be understood, however, that other polymer materials may also be employed in the base layer and/or skin layer(s), such as polyolefin polymers.

The thickness of the film may be relatively small to increase flexibility. For example, the film may have a thickness of from about 1 to about 200 micrometers, in some embodiments from about 2 to about 150 micrometers, in some embodiments from about 5 to about 100 micrometers, and in some embodiments, from about 10 to about 60 micrometers.

In addition to a film, the polymeric material may also be in the form of a fibrous material or a layer or component of a fibrous material, which can include individual staple fibers or filaments (continuous fibers), as well as yarns, fabrics, etc. formed from such fibers. Yarns may include, for instance, multiple staple fibers that are twisted together ("spun yarn"), filaments laid together without twist ("zero-twist yarn"), filaments laid together with a degree of twist, single filament with or without twist ("monofilament"), etc. The yarn may or may not be texturized. Suitable fabrics may likewise include, for instance, woven fabrics, knit fabrics, nonwoven fabrics (e.g., spunbond webs, meltblown webs, bonded carded webs, wet-laid webs, airlaid webs, coform webs, hydraulically entangled webs, etc.), and so forth.

Fibers formed from the thermoplastic composition may generally have any desired configuration, including monocomponent and multicomponent (e.g., sheath-core configuration, side-by-side configuration, segmented pie configuration, island-in-the-sea configuration, and so forth). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer such as polyesters, e.g., polylactic acid, polyethylene terephthalate, polybutylene terephthalate, and so forth; polyolefins, e.g., polyethylene, polypropylene, polybutylene, and so forth; polytetrafluoroethylene; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes.

Due to its unique ability to provide enhanced properties at those locations where they are most needed, the resulting polymeric material of the present invention is well suited for use in a variety of different types of articles, such as an absorbent article, packaging film, barrier film, medical product (e.g., gown, surgical drape, facemask, head covering, surgical cap, shoe covering, sterilization wrap, warming blanket, heating pad, etc.), and so forth. For example, the polymeric material may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, the polymeric material may be in the form of a film that is used in an absorbent article, such as a liquid-impermeable film of the outer cover, which is either vapor-permeable. In such embodiments, untreated zones of the film may be provided the desired breathability, while other heat treated zones may be generally impermeable to liquid and vapors.

The polymeric material may also be employed in a wide variety of other types of articles. Non-limiting examples include, for instance, toys, insulation materials for refrigeration units (e.g., refrigerators, freezers, vending machines, etc.); automotive components (e.g., front and rear seats, headrests, armrests, door panels, rear shelves/package trays, steering wheels and interior trim, dashboards, etc.); building panels and sections (e.g., roofs, wall cavities, under floors, etc.); apparel (e.g., coats, shirts, pants, gloves, aprons, coveralls, shoes, boots, headware, sock liners, etc.); furniture and bedding (e.g., sleeping bags, comforters, etc.); fluid storage/transfer systems (e.g., pipes or tankers for liquid/gas hydrocarbons, liquid nitrogen, oxygen, hydrogen, or crude oil); extreme environments (e.g., underwater or space); food and beverage products (e.g., cups, cup holders, plates, etc.); containers and bottles; and so forth. The polymeric material may also be used in a "garment", which is generally meant to include any article that is shaped to fit over a portion of a body. Examples of such articles include, without limitation, clothing (e.g., shirts, pants, jeans, slacks, skirts, coats, activewear, athletic, aerobic, and exercise apparel, swimwear, cycling jerseys or shorts, swimsuit/bathing suit, race suit, wetsuit, bodysuit, etc.), footwear (e.g., shoes, socks, boots, etc.), protective apparel (e.g., firefighter's coat), clothing accessories (e.g., belts, bra straps, side panels, gloves, hosiery, leggings, orthopedic braces, etc.), undergarments (e.g., underwear, t-shirts, etc.), compression garments, draped garments (e.g., kilts loincloths, togas, ponchos, cloaks, shawls, etc.), and so forth.

The polymeric material may be employed in a wide variety of articles within any particular application. For example, when considering automotive applications, the polymeric material may be employed in fibrous articles or as solid moldings. By way of example, fibers of the polymeric material may be beneficially employed in articles that can enhance comfort and/or aesthetics of a vehicle (e.g., coverings and/or paddings for sun visors, speaker housings and coverings, seat coverings, seal slip agents, and backings for seat coverings, carpeting and carpet reinforcement including carpet backing, car mats and backings for car mats, coverings for seat belts and seat belt anchorages, trunk floor coverings and liners, rear shelf panels, headliner facings and backings, upholstery backings, general decorative fabrics, etc.), materials that can provide general temperature and/or noise insulation (e.g., column padding, door trim pads, hood liners, general sound proofing and insulation materials, muffler wraps, bodywork parts, windows, saloon roofs, and sunroofs, tire reinforcements, etc.), and filtration/engine materials (e.g., fuel filters, oil filters, battery separators, cabin air filters, transmission tunnel materials, fuel tanks, etc.).

Solid moldings including the polymeric material can be utilized to enhance automotive safety components. For instance, the polymeric material can be encompassed in passive safety components such as crumple zones on the rear, front, and/or sides of a vehicle; within the safety cell of the automobile, as a component of the airbag or steering wheel (e.g., a collapsible steering column); as a cargo barrier; or as a component of a pedestrian safety system (e.g., as a component of the bumpers, hood, window frame, etc.).

The low density of the polymeric material can provide weight saving benefits in automotive applications. For example, the polymeric material can be a component of the structure of an automobile including, without limitation, the hood, bumpers and/or bumper supports, the trunk lid and/or compartment, and the underbody of the vehicle.

Such broad-based application of the polymeric material is applicable to a wide variety of fields, and is not intended to be in any way limited to the automotive industry. For instance, the polymeric material can be used in the transportation industry in any suitable application including, without limitation, air and space applications (e.g., airplanes, helicopters, space transports, military aerospace devices, etc.), marine applications (boats, ships, recreational vehicles), trains, and so forth. The polymeric material can be utilized in transportation applications in any desired fashion, e.g., in fibrous articles or solid moldings, in aesthetic applications, for temperature and/or noise insulation, in filtration and/or engine components, in safety components, etc.

The present invention may be better understood with reference to the following examples.

Test Methods

Water Vapor Transmission Rate ("WVTR")

The test used to determine the WVTR of a material may vary based on the nature of the material. One technique for measuring the WVTR value is ASTM E96/96M-12, Procedure B. Another method involves the use of INDA Test Procedure IST-70.4 (01). The INDA test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modem Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow that is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$$TR^{-1}_{test\ material} = TR^{-1}_{test\ material,guardfilm,airgap} - TR^{-1}_{gaurdfilm,airgap}$$

The water vapor transmission rate ("WVTR") is then calculated as follows:

$$WVTR = \frac{F \rho_{sat(T)} RH}{A P_{sat(T)}(1 - RH)}$$

wherein,

F=the flow of water vapor in cm³ per minute;

$\rho_{sat(T)}$=the density of water in saturated air at temperature T;

RH=the relative humidity at specified locations in the cell;

A=the cross sectional area of the cell; and $P_{sat(T)}$m=the saturation vapor pressure of water vapor at temperature T.

Conductive Properties

Thermal conductivity (W/mK) and thermal resistance (m²K/W) may be determined in accordance with ASTM E-1530-11 ("Resistance to Thermal Transmission of Materials by the Guarded Heat Flow Meter Technique") using an Anter Unitherm Model 2022 tester. The target test temperature may be 25° C. and the applied load may be 0.17 MPa. Prior to testing, the samples may be conditioned for 40+ hours at a temperature of 23° C. (±2° C.) and relative humidity of 50% (±10%). Thermal admittance (W/m²K) may also be calculated by dividing 1 by the thermal resistance.

Film Tensile Properties

Films may be tested for tensile properties (peak stress, modulus, strain at break, and energy per volume at break) on a MTS Synergie 200 tensile frame. The test may be performed in accordance with ASTM D638-10 (at about 23° C.). Film samples may be cut into dog bone shapes with a center width of 3.0 mm before testing. The dog-bone film samples may be held in place using grips on the MTS Synergie 200 device with a gauge length of 18.0 mm. The film samples may be stretched at a crosshead speed of 5.0 in/min until breakage occurred. Five samples may be tested for each film in both the machine direction (MD) and the cross direction (CD). A computer program (e.g., TestWorks 4) may be used to collect data during testing and to generate a stress versus strain curve from which a number of properties may be determined, including modulus, peak stress, elongation, and energy to break.

Melt Flow Rate

The melt flow rate ("MFR") is the weight of a polymer (in grams) forced through an extrusion rheometer orifice (0.0825-inch diameter) when subjected to a load of 2160 grams in 10 minutes, typically at 190° C., 210° C., or 230° C. Unless otherwise indicated, melt flow rate is measured in accordance with ASTM Test Method D1239 with a Tinius Olsen Extrusion Plastometer.

Thermal Properties

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E″/E′).

The melting temperature may be determined by differential scanning calorimetry (DSC). The differential scanning calorimeter may be a DSC Q100 Differential Scanning Calorimeter, which may be outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools may be used. The samples may be placed into an aluminum pan and weighed to an accuracy of 0.01 milligram on an analytical balance. A lid may be crimped over the material sample onto the pan. Typically, the resin pellets may be placed directly in the weighing pan.

The differential scanning calorimeter may be calibrated using an indium metal standard and a baseline correction may be performed, as described in the operating manual for the differential scanning calorimeter. A material sample may be placed into the test chamber of the differential scanning calorimeter for testing, and an empty pan may be used as a reference. All testing may be run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program may be a 1-cycle test that begins with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing may be run with a 55-cubic centimeter per minute nitrogen (industrial grade) purge on the test chamber.

The results may be evaluated using the UNIVERSAL ANALYSIS 2000 analysis software program, which identifies and quantifies the glass transition temperature ($T_g$) of inflection, the endothermic and exothermic peaks, and the areas under the peaks on the DSC plots. The glass transition temperature may be identified as the region on the plot-line where a distinct change in slope occurred, and the melting temperature may be determined using an automatic inflection calculation.

Density and Percent Pore Volume

To determine density and percent pore volume, the width ($W_i$) and thickness ($T_i$) of the specimen may be initially measured prior to drawing. The length ($L_i$) before drawing may also be determined by measuring the distance between two markings on a surface of the specimen. Thereafter, the specimen may be drawn to initiate voiding. The width ($W_f$), thickness ($T_f$), and length ($L_f$) of the specimen may then be measured to the nearest 0.01 mm utilizing Digimatic Caliper (Mitutoyo Corporation). The volume ($V_i$) before drawing may be calculated by $W_i \times T_i \times L_i = V_i$. The volume ($V_f$) after drawing may also be calculated by $W_f \times T_f \times L_f = V_f$. The density ($P_f$) may be calculated by: $P_f = P_i / \Phi$, where $P_i$ is density of precursor material, and the percent pore volume (% $V_v$) may be calculated by: % $V_v = (1 - 1/\Phi) \times 100$.

Moisture Content

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§X2.1.2) may be 130° C., the sample size (§X2.1.1) may be 2 to 4 grams, and the vial purge time (§X2.1.4) may be 30 seconds. Further, the ending criteria (§X2.1.3) may be defined as a "prediction" mode, which means that the test is ended when the built-in programmed criteria (which mathematically calculates the end point moisture content) is satisfied.

EXAMPLE 1

The ability to create a unique porous network within a polymeric material was demonstrated. Initially, a thermoplastic composition was formed from 85.3 wt. % polylactic acid (PLA 6201D, Natureworks®), 9.5 wt. % of a microinclusion additive, 1.4 wt. % of a nanoinclusion additive, and 3.8 wt. % of an internal interfacial modifier. The microinclusion additive was Vistamaxx™ 2120 (ExxonMobil), which is a polypropylene-polyethylene copolymer elastomer with a melt flow rate of 29 g/10 min (190° C., 2160 g) and a density of 0.866 g/cm³. The nanoinclusion additive was poly(ethylene-co-methyl acrylate-co-glycidyl methacrylate) (Lotader® AX8900, Arkema) having a melt flow rate of 5-6 g/10 min (190° C./2160 g), a glycidyl methacrylate content of 7 to 11 wt. %, methyl acrylate content of 13 to 17 wt. %, and ethylene content of 72 to 80 wt. %. The internal interfacial modifier was PLURIOL® WI 285 Lubricant from BASF, which is a polyalkylene glycol functional fluid.

The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a film thickness ranging from 36 µm to 54 µm. The films were stretched in the machine direction to about 100% to initiate cavitation and void formation.

Figure 5:
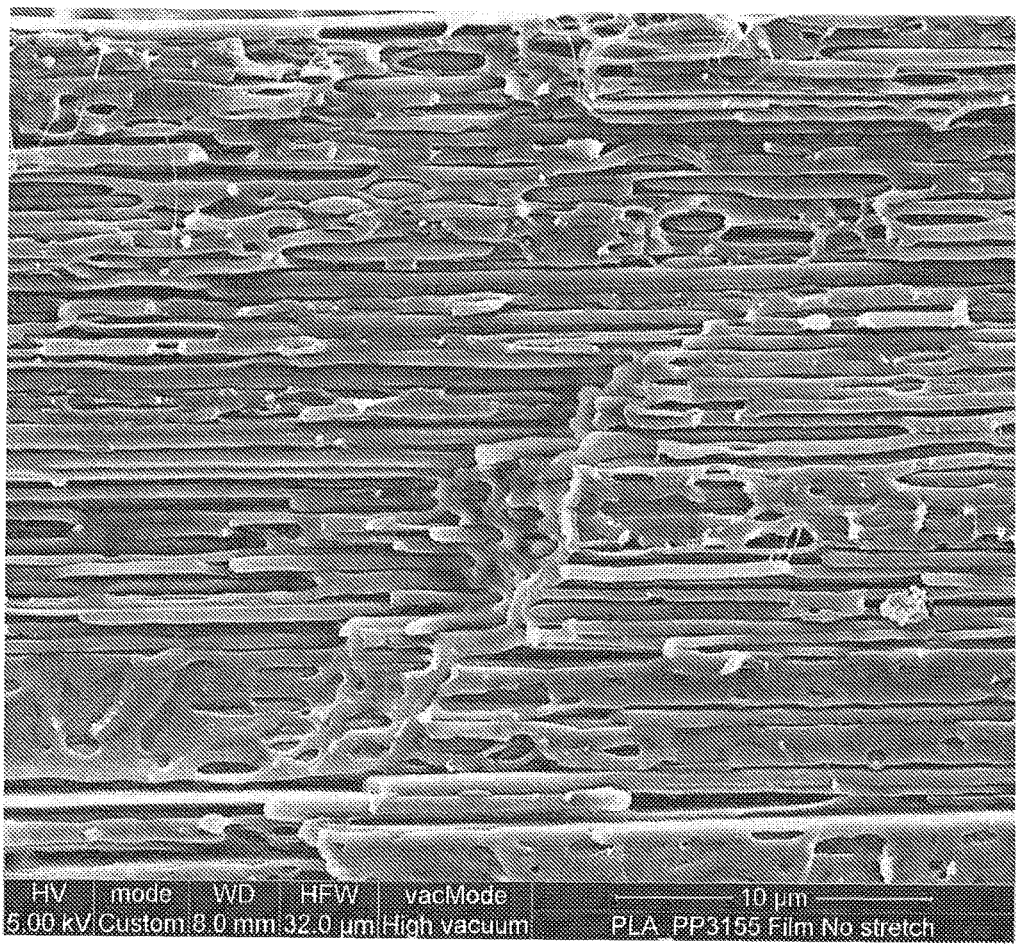
FIGS. 5-6 are SEM microphotographs of the unstretched film of Example 1, where the film was cut perpendicular to the machine direction in FIG. 5 and parallel to the machine direction in FIG. 6.
Figure 6:
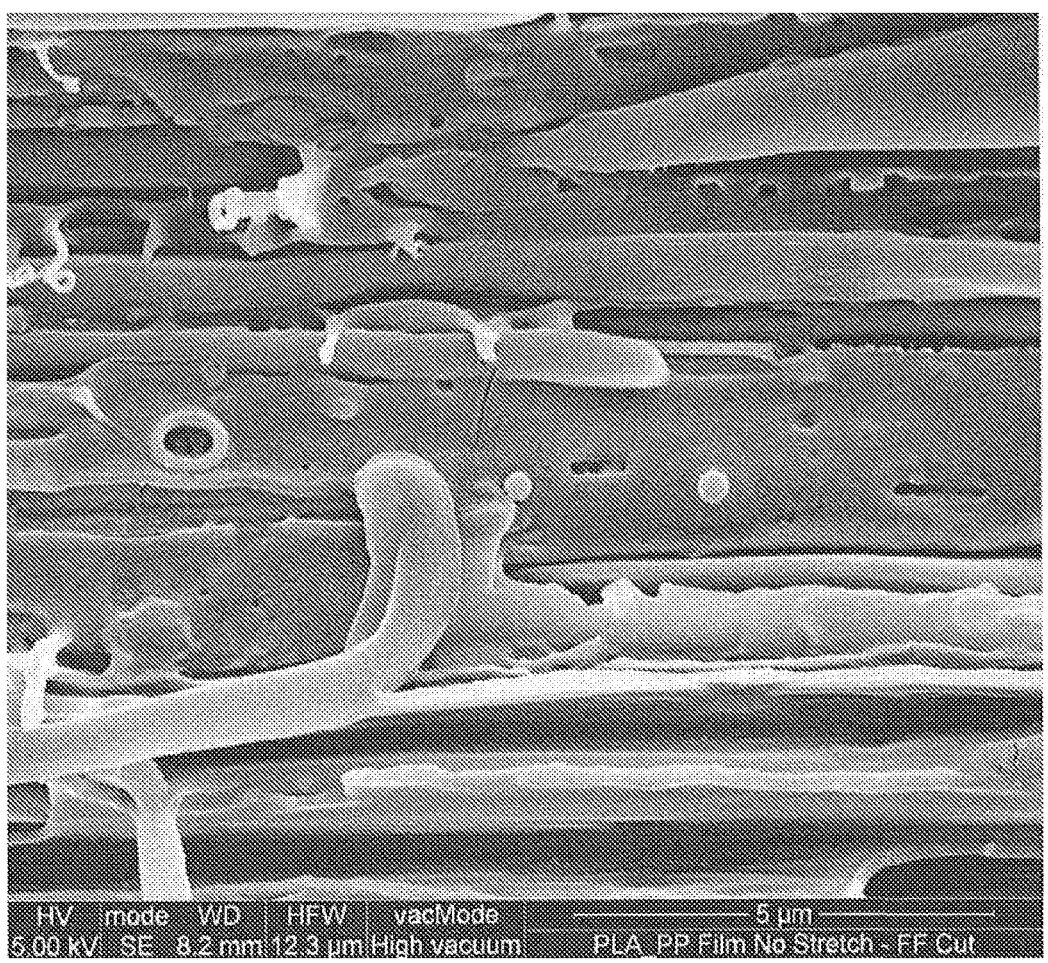
Figure 7:
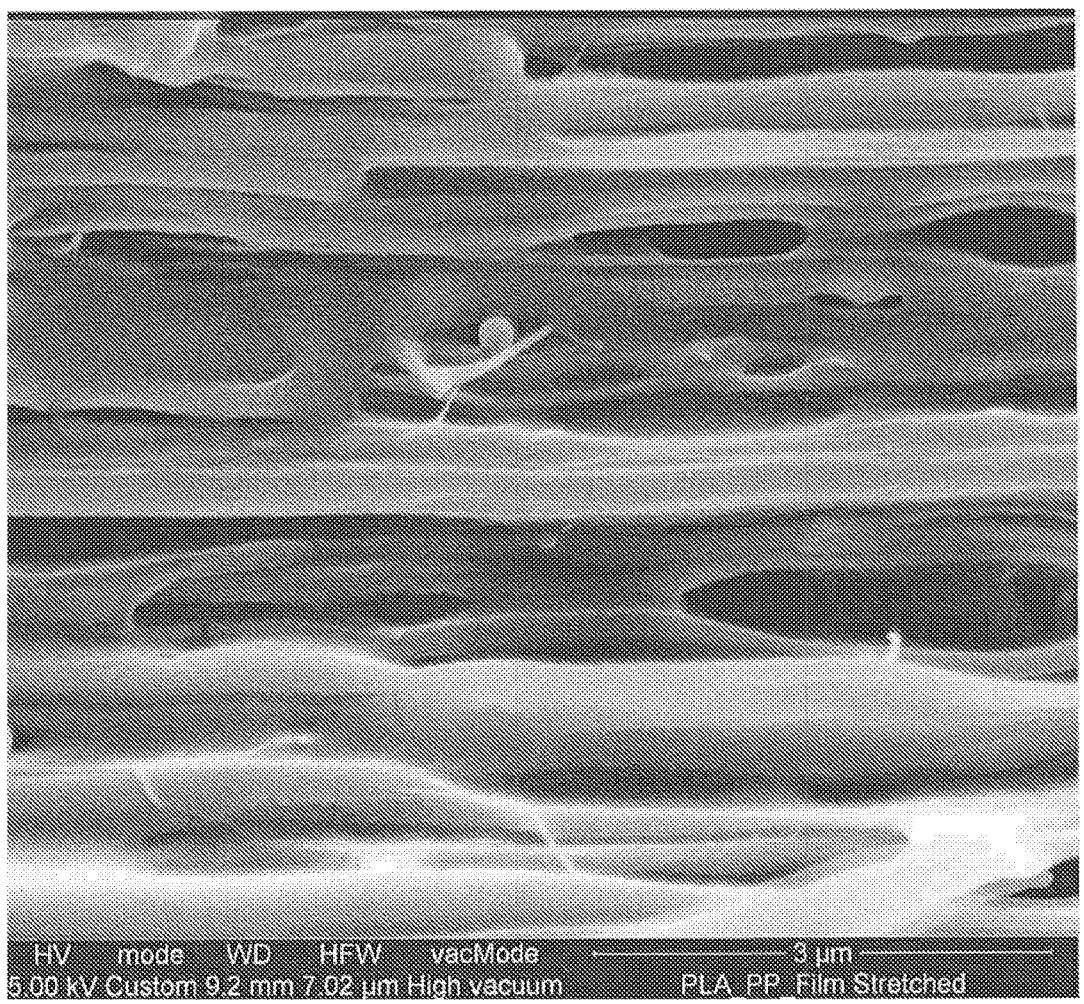
FIGS. 7-8 are SEM microphotographs of the stretched film of Example 1 (film was cut parallel to machine direction orientation).
Figure 8:
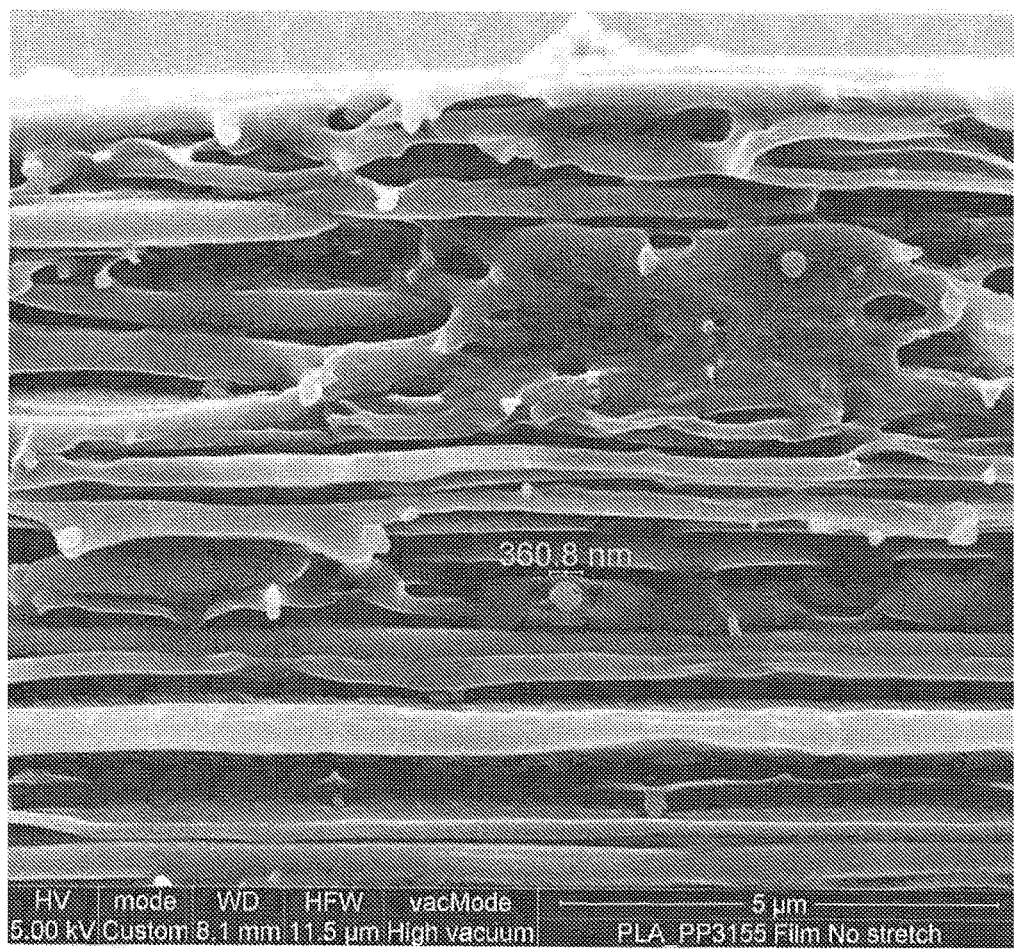

The morphology of the films was analyzed by scanning electron microscopy (SEM) before and after stretching. The results are shown in FIGS. 5-8. As shown in FIGS. 5-6, the microinclusion additive was initially dispersed in domains having an axial size (in machine direction) of from about 2 to about 30 micrometers and a transverse dimension (in cross-machine direction) of from about 1 to about 3 micrometers, while the nanoinclusion additive was initially dispersed as spherical or spheroidal domains having an axial size of from about 100 to about 300 nanometers. FIGS. 7-8 show the film after stretching. As indicated, pores formed around the inclusion additives. The micropores formed around the microinclusion additive generally had an elongated or slit-like shape with a broad size distribution ranging from about 2 to about 20 micrometers in the axial direction. The nanopores associated with the nanoinclusion additive generally had a size of from about 50 to about 500 nanometers.

EXAMPLE 2

The compounded pellets of Example 1 were dry blended with a third inclusion additive, which was a halloisite clay masterbatch (MacroComp MNH-731-36, MacroM) containing 22 wt. % of a styrenic copolymer modified nanoclay and 78 wt. % polypropylene (Exxon Mobil 3155). The mixing ratio was 90 wt. % of the pellets and 10 wt. % of the clay masterbatch, which provided a total clay content of 2.2%.

The dry blend was then flood fed into a signal screw extruder heated to a temperature of 212° C., where the molten blend exited through 4.5 inch width slit die and drawn to a film thickness ranging from 51 to 58 µm. The films were stretched in the machine direction to about 100% to initiate cavitation and void formation.

Figure 9:
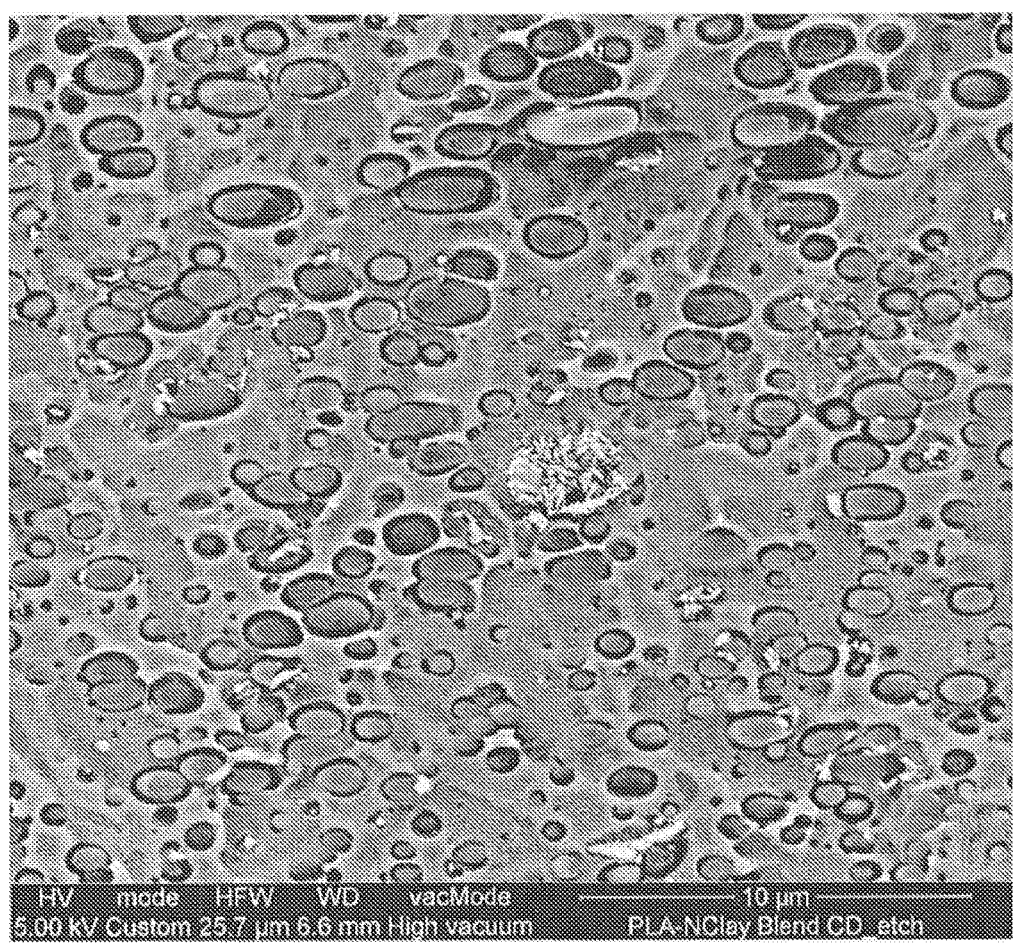
FIGS. 9-10 are SEM microphotographs of the unstretched film of Example 2, where the film was cut perpendicular to the machine direction in FIG. 9 and parallel to the machine direction in FIG. 10.
Figure 10:
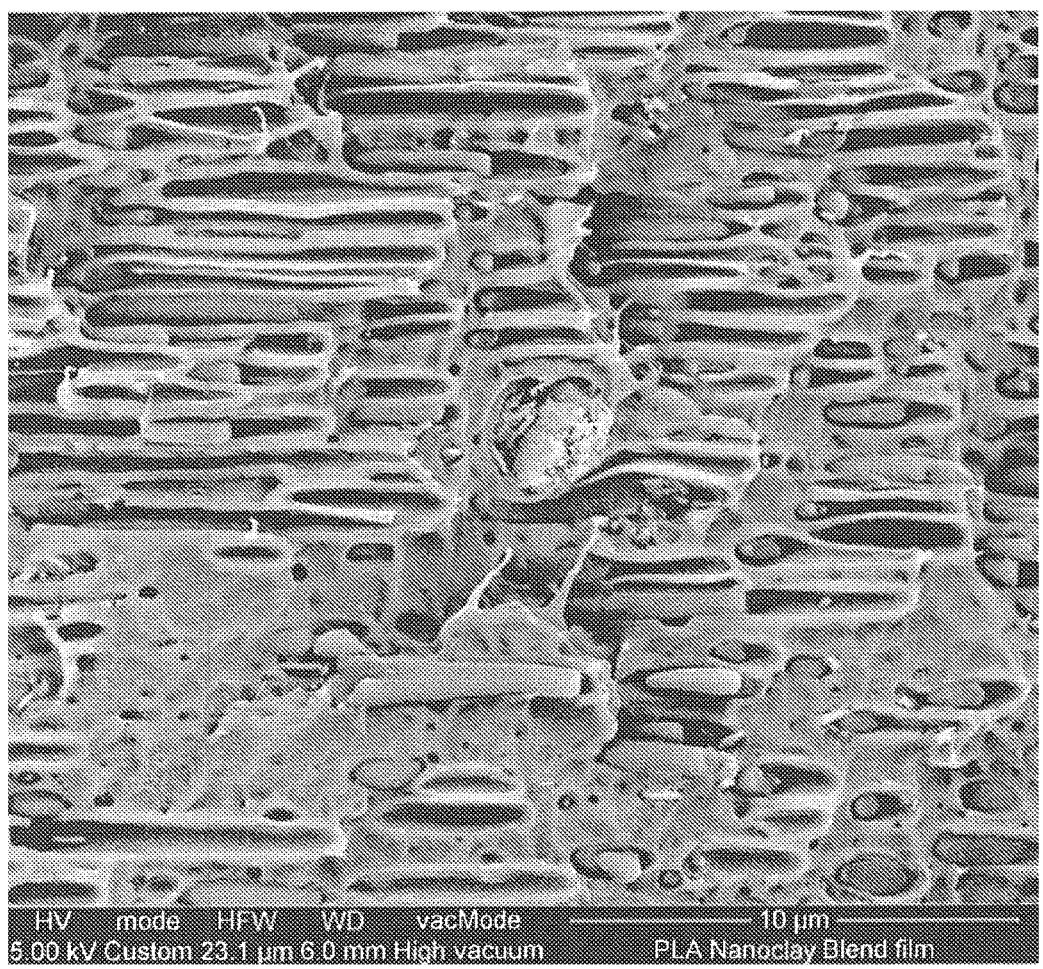
Figure 11:
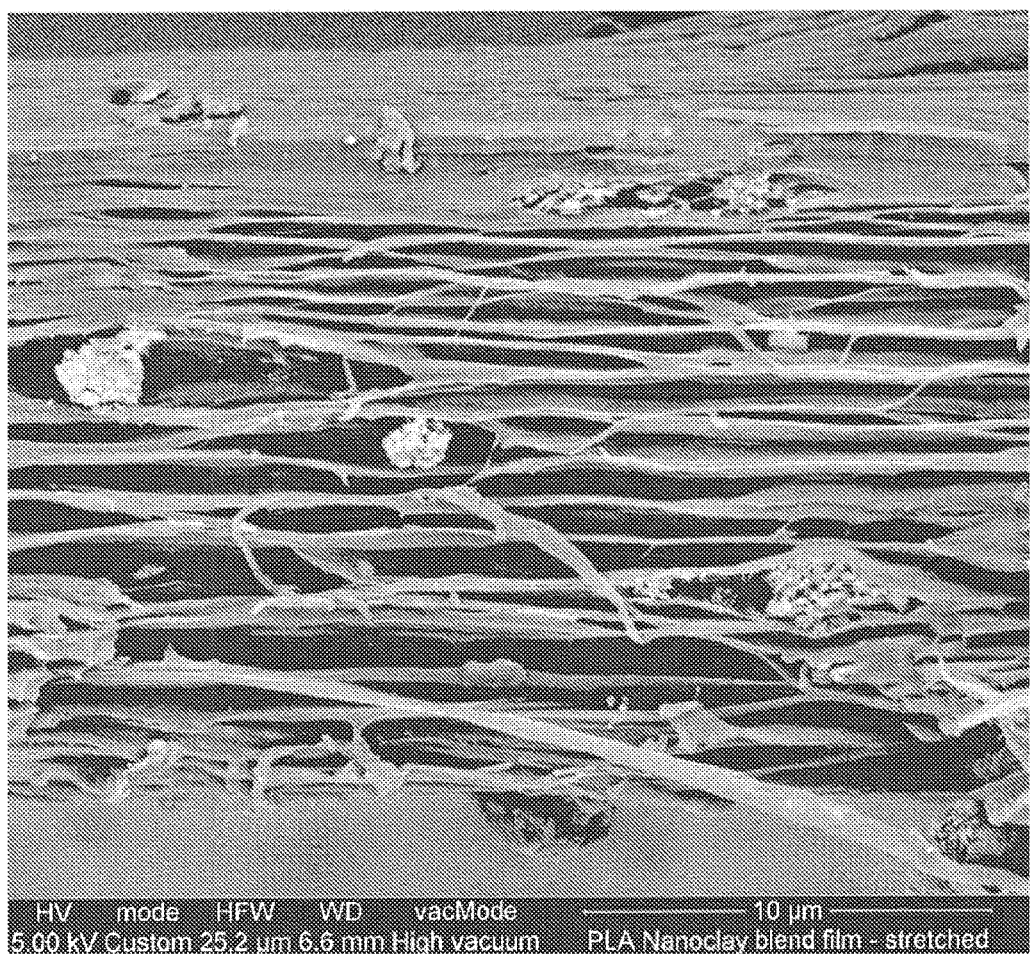
FIGS. 11-12 are SEM microphotographs of the stretched film of Example 2 (film was cut parallel to machine direction orientation).
Figure 12:
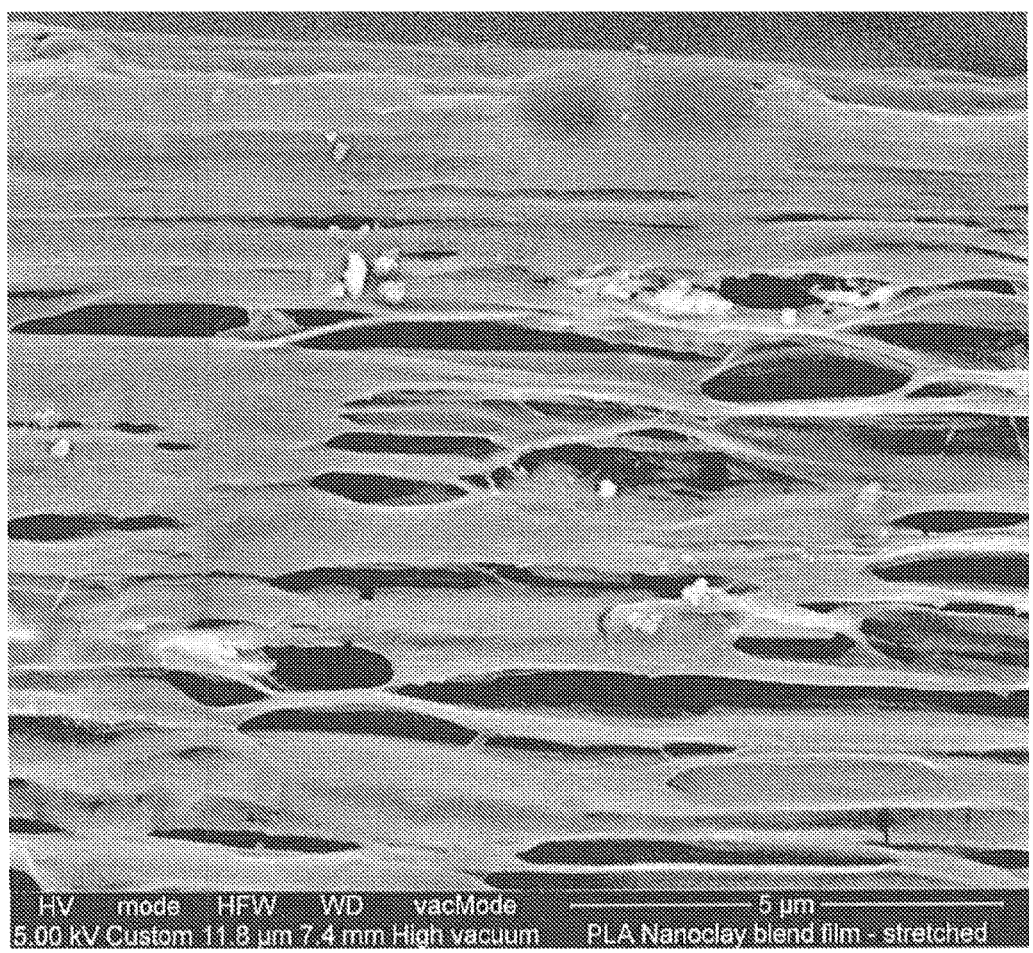

The morphology of the films was analyzed by scanning electron microscopy (SEM) before and after stretching. The results are shown in FIGS. 9-12. As shown in FIGS. 9-10, some of the nanoclay particles (visable as brighter regions) became dispersed in the form of very small domains—i.e., axial dimension ranging from about 50 to about 300 nanometers. The masterbatch itself also formed domains of a micro-scale size (axial dimension of from about 1 to about 5 micrometers). Also, the microinclusion additive (Vistamax™) formed elongated domains, while the nanoinclusion additive (Lotader®, visible as ultrafine dark dots) and the nanoclay masterbatch formed spheroidal domains. The stretched film is shown in FIGS. 11-12. As shown, the voided structure is more open and demonstrates a broad variety of pore sizes. In addition to highly elongated micropores formed by the first inclusions (Vistamaxx™), the nanoclay masterbatch inclusions formed more open spheroidal micropores with an axial size of about 10 microns or less and a transverse size of about 2 microns. Spherical nanopores are also formed by the second inclusion additive (Lotader®) and third inclusion additive (nanoclay particles).

EXAMPLE 3

The ability to create a polymeric material having unique properties was demonstrated. Initially, a blend of 85.3 wt. % PLA 6201D, 9.5 wt. % of Vistamaxx™ 2120, 1.4 wt. % of Lotader® AX8900, and 3.8 wt. % of PLURIOL® WI 285 was formed. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a film thickness ranging from 0.54 to 0.58 mm.

EXAMPLE 4

The sheet produced in Example 3 was cut to a 6" length and then drawn to 100% elongation using a MTS 820 hydraulic tensile frame in tensile mode at 50 mm/min.

EXAMPLE 5

The sheet produced in Example 3 was cut to a 6" length and then drawn to 150% elongation using a MTS 820 hydraulic tensile frame in tensile mode at 50 mm/min.

EXAMPLE 6

The sheet produced in Example 3 was cut to a 6" length and then drawn to 200% elongation using a MTS 820 hydraulic tensile frame in tensile mode at 50 mm/min. The thermal properties of Examples 3-6 were then determined. The results are set forth in the table below.

| Example | Sample Thickness (mm) | Upper Surface Temp. (° C.) | Lower Surface Temp (° C.) | Heat Sink Temp (° C.) | Mean Sample Temp (° C.) | Thermal Resistance (m²K/W) | Thermal Admittance (W/m²K) | Thermal Conductivity (W/mK) |
|---|---|---|---|---|---|---|---|---|
| 3 | 0.58 | 40.5 | 30.0 | 11.3 | 35.3 | 0.0032 | 312.5 | 0.180 |
| 4 | 0.54 | 40.5 | 26.4 | 10.3 | 33.5 | 0.0054 | 185.2 | 0.100 |
| 5 | 0.57 | 40.5 | 26.1 | 10.3 | 33.3 | 0.0057 | 175.4 | 0.100 |
| 6 | 0.56 | 40.5 | 25.1 | 10.0 | 32.8 | 0.0064 | 156.3 | 0.087 |

EXAMPLE 7

Pellets were formed as described in Example 3 and then flood fed into a Rheomix 252 single screw extruder with a L/D ratio of 25:1 and heated to a temperature of 212° C. where the molten blend exited through a Haake 6 inch width s cast film die and drawn to a film thickness ranging from 39.4 μm to 50.8 μm via Haake take-up roll. The film was drawn in the machine direction to a longitudinal deformation of 160% at a pull rate of 50 mm/min (deformation rate of 67%/min) via MTS Synergie 200 tensile frame with grips at a gage length of 75 mm.

EXAMPLE 8

Films were formed as described in Example 7, except that the film was also stretched in the cross-machine direction to a deformation of 100% at a pull rate of 50 mm/min (deformation rate of 100%/min) with grips at a gage length of 50 mm. Various properties of the films of Examples 7-8 were tested as described above. The results are set forth below in the tables below.

| | | Tensile Properties | | | | |
|---|---|---|---|---|---|---|
| Example | | Avg. Thickness (μm) | Avg. Modulus (MPa) | Avg. Yield Stress (MPa) | Avg. Break Stress (MPa) | Avg. Strain at Break (%) | Avg. Energy per Volume at Break (J/cm³) |
| 7 | MD | 44.5 | 466 | 41.4 | 36.9 | 54.6 | 16.8 |
|   | CD | 40.4 | 501 | 15.9 | 15.9 | 62.6 | 9.4 |
| 8 | MD | 37.3 | 265 | 26.7 | 26.3 | 85.5 | 15.8 |
|   | CD | 34.3 | 386 | 25.1 | 25.2 | 45.8 | 9.3 |

| | Film Properties | | | |
|---|---|---|---|---|
| Ex. | Average Thickness (μm) | Expansion Ratio (φ) | Percent Void Volume (% $V_v$) | Density (g/cm³) | WVTR (g/m²*24 hrs.) |
| 7 | 41.4 | 1.82 | 45 | 0.65 | 5453 |
| 8 | 34.0 | 2.13 | 53 | 0.56 | 4928 |

EXAMPLE 9

Three (3) samples of the stretched and voided films of Example 1 were formed to a density of 0.60 g/cm³. These films were subjected to heat treatment at a temperature of 40° C., 60° C., and 90° C., respectively. The tensile properties and density were then determined and compared to the properties of the film prior to heat treatment. The results are set forth in the table below.

| Heat Treatment | Density (g/cm³) | Ratio of Unheated to Heated Density | Avg Strain at Break (%) | Ratio of Unheated to Heated Strain at Break | Avg. Modulus (MPa) | Ratio of Unheated to Heated Modulus | Avg Break Stress (MPa) | Ratio of Unheated to Heated Break Stress |
|---|---|---|---|---|---|---|---|---|
| — | 0.60 | — | 60 | — | 898 | — | 39.4 | — |
| 40° C. | 0.62 | 0.96 | 59 | 1.02 | 889 | 0.99 | 39.5 | 1.00 |
| 60° C. | 0.77 | 0.78 | 76 | 0.79 | 1263 | 0.71 | 44.5 | 0.88 |
| 90° C. | 0.86 | 0.70 | 91 | 0.66 | 1467 | 0.61 | 46.2 | 0.85 |

EXAMPLE 10

Three (3) samples of the stretched and voided films of Example 1 were formed to a density of 0.72 g/cm³. These films were subjected to heat treatment at a temperature of 40° C., 60° C., and 90° C., respectively. The tensile properties and density were then determined and compared to the properties of the film prior to heat treatment. The results are set forth in the table below.

| Heat Treatment | Density (g/cm³) | Ratio of Unheated to Heated Density | Avg. Strain at Break (%) | Ratio of Unheated to Heated Strain at Break | Avg. Modulus (MPa) | Ratio of Unheated to Heated Modulus | Avg. Break Stress (MPa) | Ratio of Unheated to Heated Break Stress |
|---|---|---|---|---|---|---|---|---|
| — | 0.72 | — | 78 | — | 975 | — | 38.2 | — |
| 40° C. | 0.73 | 0.99 | 74 | 1.05 | 987 | 0.99 | 39.8 | 0.96 |
| 60° C. | 0.85 | 0.85 | 64 | 0.82 | 1191 | 0.82 | 42.7 | 0.89 |
| 90° C. | 0.98 | 0.73 | 88 | 1.13 | 1594 | 0.61 | 45.0 | 0.85 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for selectively controlling the degree of porosity in a polymeric material, wherein the material is formed from a thermoplastic composition containing a microinclusion additive and nanoinclusion additive that are dispersed within a continuous phase of a matrix polymer in the form of discrete domains, and wherein the at least a portion of the polymeric material is strained so that a porous network is formed therein, the method comprising:
heat treating at least a portion of the strained polymeric material, wherein the heat treated material exhibits a lower pore volume than the material prior to heat treatment.

2. The method of claim 1, wherein the material is heat treated at a temperature above the glass transition temperature of the matrix polymer.

3. The method of claim 1, wherein the material is heat treated at a temperature of from about 40° to about 200° C.

4. The method of claim 1, wherein the polymeric material is strained at a temperature of from about −50° C. to about 125° C.

5. The method of claim 1, wherein the polymeric material is strained at a temperature that is at least about 10° C.

6. The method of claim 1, wherein the polymeric material is strained to a draw ratio of from about 1.1 to about 3.5.

7. The method of claim 1, wherein the average pore volume of the strained material prior to heat treatment is from about 15% to about 80% per cm³.

8. The method of claim 7, wherein the average pore volume of the material after heat treatment is less than about 40%.

9. The method of claim 1, wherein the ratio of the density of the strained material prior to heat treatment to the density of the material after heat treatment is from about 0.1 to about 0.95.

10. The method of claim 1, wherein the ratio of the modulus of elasticity of the strained polymeric material prior to heat treatment to the modulus of elasticity of the material after heat treatment is from about 0.1 to about 0.95.

11. The method of claim 1, wherein the modulus of elasticity of the strained polymeric material prior to heat treatment is about 2500 MPa or less.

12. The method of claim 11, wherein the modulus of elasticity of the polymeric material after heat treatment is greater than about 1000 MPa.

13. The method of claim 1, wherein the material defines a first strained zone that is contiguous to a second strained zone, wherein only the second strained zone is subjected to the heat treatment.

14. The method of claim 13, wherein the average pore volume of the material within the first zone is from about 15% to about 80% per cm³.

15. The method of claim 13, wherein the ratio of the modulus of elasticity of the material within the first zone to the modulus of elasticity of the material within the second zone is from about 0.1 to about 0.95.

16. The method of claim 15, wherein the modulus of elasticity of the material within the first zone is about 2500 MPa or less.

17. The method of claim 1, wherein the porous network includes a plurality of nanopores having an average cross-sectional dimension of about 800 nanometers or less.

18. The method of claim 17, wherein the porous network further includes micropores.

19. The method of claim 18, wherein the aspect ratio of the micropores is from about 1 to about 30.

20. The method of claim 1, wherein the continuous phase constitutes from about 60 wt. % to about 99 wt. % of the thermoplastic composition.

21. The method of claim 1, wherein the matrix polymer includes a polyester or polyolefin.

22. The method of claim 21, wherein the polyester has a glass transition temperature of about 0° C. or more.

23. The method of claim 21, wherein the polyester includes polylactic acid.

24. The method of claim 1, wherein the microinclusion additive includes a polyolefin.

25. The method of claim 1, wherein the ratio of the solubility parameter for the matrix polymer to the solubility parameter of the microinclusion additive is from about 0.5 to about 1.5, the ratio of the melt flow rate for the matrix polymer to the melt flow rate of the microinclusion additive is from about 0.2 to about 8, and/or the ratio of the Young's modulus elasticity of the matrix polymer to the Young's modulus of elasticity of the microinclusion additive is from about 1 to about 250.

26. The method of claim 1, wherein the nanoinclusion additive is a functionalized polyolefin.

27. The method of claim 1, wherein the nanoinclusion additive is a polyepoxide.

28. The method of claim 1, wherein the microinclusion additive constitutes from about 1 wt. % to about 30 wt. % of the composition, based on the weight of the continuous phase.

29. The method of claim 1, wherein the nanoinclusion additive constitutes from about 0.05 wt. % to about 20 wt. % of the composition, based on the weight of the continuous phase.

30. The method of claim 1, wherein the thermoplastic composition further comprises an interphase modifier.

31. A polymeric material formed according to the method of claim 1.

* * * * *